United States Patent
Pauwels et al.

(10) Patent No.: US 12,453,753 B2
(45) Date of Patent: Oct. 28, 2025

(54) OXYGENATED CANNABIS SKIN THERAPY COMPOSITIONS AND METHODS FOR PRODUCING THE COMPOSITIONS

(71) Applicants: David Pauwels, Eureka, CA (US); Tiffany Andersen, Eureka, CA (US)

(72) Inventors: David Pauwels, Eureka, CA (US); Tiffany Andersen, Eureka, CA (US)

(73) Assignee: David Pauwels, Eureka, CA (US)

( * ) Notice: Subject to any disclaimer, the term of this patent is extended or adjusted under 35 U.S.C. 154(b) by 808 days.

(21) Appl. No.: 17/612,945

(22) PCT Filed: May 21, 2020

(86) PCT No.: PCT/US2020/034024
§ 371 (c)(1),
(2) Date: Nov. 19, 2021

(87) PCT Pub. No.: WO2020/237065
PCT Pub. Date: Nov. 26, 2020

(65) Prior Publication Data
US 2022/0226416 A1 Jul. 21, 2022

Related U.S. Application Data

(60) Provisional application No. 62/852,132, filed on May 23, 2019.

(51) Int. Cl.
| | |
|---|---|
| *A61K 36/889* | (2006.01) |
| *A61K 8/22* | (2006.01) |
| *A61K 8/49* | (2006.01) |
| *A61K 8/9794* | (2017.01) |
| *A61K 31/352* | (2006.01) |
| *A61K 36/73* | (2006.01) |
| *A61Q 19/00* | (2006.01) |
| *A61K 33/00* | (2006.01) |

(52) U.S. Cl.
CPC .............. *A61K 36/889* (2013.01); *A61K 8/22* (2013.01); *A61K 8/498* (2013.01); *A61K 8/9794* (2017.08); *A61K 31/352* (2013.01); *A61K 36/73* (2013.01); *A61Q 19/00* (2013.01); *A61K 33/00* (2013.01)

(58) Field of Classification Search
None
See application file for complete search history.

(56) References Cited

U.S. PATENT DOCUMENTS

| | | |
|---|---|---|
| 8,895,078 B2 | 11/2014 | Mueller |
| 9,034,396 B2 | 5/2015 | Zheng et al. |
| 9,259,449 B2 | 2/2016 | Raderman |
| 9,399,180 B2 | 7/2016 | Ellis et al. |
| 9,649,349 B1 | 5/2017 | Tucker et al. |
| 9,782,691 B2 | 10/2017 | Chess et al. |
| 9,815,810 B1 | 11/2017 | Ogilvie et al. |
| 9,919,241 B1 | 3/2018 | Auerbach et al. |
| 9,950,976 B1 | 4/2018 | Keller |
| 2009/0291122 A1* | 11/2009 | Vandeputte ............. A61P 17/02 424/94.4 |
| 2013/0079531 A1 | 3/2013 | Barringer |
| 2014/0271940 A1 | 9/2014 | Wurzer |
| 2015/0290267 A1 | 10/2015 | Sekura et al. |
| 2017/0240840 A1 | 8/2017 | Privitera et al. |
| 2017/0360745 A1 | 12/2017 | Blackmon et al. |
| 2017/0360861 A1 | 12/2017 | Humphreys et al. |
| 2018/0362429 A1 | 12/2018 | Zhang et al. |

FOREIGN PATENT DOCUMENTS

| | | |
|---|---|---|
| GB | 2567235 | 4/2019 |
| RU | 2630312 | 7/2016 |
| WO | 2006-021924 | 3/2006 |
| WO | 2019-089583 | 5/2019 |
| WO | WO-2019089583 A1 * | 5/2019 ........... A61K 31/015 |

OTHER PUBLICATIONS

International Search Report and the Written Opinion of PCT/US2020/034024, mailed Sep. 3, 2020.
Bridgeman et al., "Medicinal Cannabis: History, Pharmacology, And Implications for the Acute Care Setting," P&T (2017) 42(3):180-188.
Song et al., "The antibacterial effect of topical ozone on the treatment of MSRA skin infection," Molecular Medicine Reports (2018) 17:2449-2455.
Kim et al., "Therapeutic Effects of Topical Application of Ozone on Acute Cutaneous Wound Healing," J. Korean Med. Sci. (2009) 24:368-374.
Travagli et al., "Ozone and Ozonated Oils in Skin Diseases: A Review," Mediators of Inflammation (2010) 2010:610418, 9 pages.
Pai et al., "Potential of Ozonated Sesame Oil to Augment Wound Healing in Rats," Indian J. Pharm. Sci. (2014) 76(1):87-92.
Montevecchi et al., "Comparison of the antibacterial activity of an ozonated oil with chlorhexidine digluconate and povidone-iodine. A disk diffusion test," New Microbiologica (2013) 36:289-302.
Chueshov et al., "Industrial Drugs Technology: textbook for students of higher educational institutions, translated from Ukrainian in 2 parts, Part 1," Vinnitsa: Nova Kniga, 2014, p. 696, pp. 396-403 and 487 (in Russian).
June-Wells et al., "Your Guide To Hydrocarbon Extraction," Cannabis Business Times, published Nov. 1, 2019 [online], retrieved on Nov. 18, 2021 from: <URL:https://www.cannabisbusinesstimes.com/article/your-guide-to-hydrocarbon-extraction/>, 6 pages.
Diaz et al., "Physiochemical characteristics of ozonated sunflower oils obtained by different procedures," Grasas y Aceites 63(4): 466-474 (2012), DOI: 10.3989/gya.073212.

* cited by examiner

*Primary Examiner* — Dominic Lazaro
(74) *Attorney, Agent, or Firm* — Bryan Cave Leighton Paisner LLP

(57) ABSTRACT

Provided are oxygenated *Cannabis* skin therapy compositions, and methods for preparing the compositions by ozonating coconut oil, extracting medicinal/recreational *Cannabis* into coconut oil to yield a *Cannabis* infused coconut oil, and combining the ozonated coconut oil with the *Cannabis* infused coconut oil to yield the skin therapy compositions.

20 Claims, No Drawings

OXYGENATED CANNABIS SKIN THERAPY COMPOSITIONS AND METHODS FOR PRODUCING THE COMPOSITIONS

RELATED APPLICATIONS

This application is a National Stage Application of International Application No. PCT/US2020/034024, filed May 21, 2020, which claims the benefit of priority to U.S. Provisional Application No. 62/852,132 to David Pauwels and Tiffany Andersen, titled "OXYGENATED *Cannabis* SKIN THERAPY COMPOSITIONS AND METHODS FOR PRODUCING THE COMPOSITIONS," filed May 23, 2019, the subject matter of which is incorporated by reference herein in its entirety.

FIELD OF THE INVENTION

The present invention relates to *Cannabis* skin therapy compositions and to methods for producing the *Cannabis* skin therapy compositions.

BACKGROUND OF THE INVENTION

In the United States, *Cannabis* plants were conventionally grown for the fiber from its external bark for use in products like rope and clothing, as well as for oilseed and for use as a patent medicine from the mid-$19^{th}$ century. The recreational use of *Cannabis* started in the 1920s during the prohibition of alcohol in the U.S. but such uses were soon banned by many countries in the 1930s. During the 1960s, consuming *Cannabis* was widely used as a form of protest against the government. In 1996, California legalized the use of *Cannabis* for medicinal purposes, and since 2017 almost 30 states in the U.S. have decriminalized possession of small amounts of *Cannabis*, while 8 states have legalized recreational *Cannabis* use (see Bridgeman et al., *P & T* 42(3): 180-188 (2017)).

Tetrahydrocannabinol (THC)-infused cosmetics and skin care products are becoming increasingly available in the U.S. in states that have legalized recreational use of medicinal *Cannabis*. The U.S. cosmetics market has seen large annual growth rate over the past decade, and it is expected that THC-infused cosmetics and skin care products will become a growing segment over the next decade. Reports indicate that the THC-infused oils can help with wound healing, eczema, skin hydration, dandruff, psoriasis, pain relief, inflammation, wrinkle reduction and reduction in sebaceous gland activity (see Song et al., *Molecular Medicine Reports* 17: 2449-2455 (2018); U.S. Pat. No. 9,259,449 (Raderman, 2016); and U.S. Pat. App. Pub. No. US20140271940 (Wurzer, 2014)). The amounts of THC and other cannabinoids extracted from medical marijuana included in these products can vary widely, and some confusion has arisen from claims to products that contain cannabidiol (CBD) oil while not disclosing their original from hemp instead of medical marijuana. Those that do include extracts from medical marijuana do not always disclose the amount of active or inactive cannabinoids, or disclose what other compounds also may have been extracted from the plant, such as terpenes or other compounds. Accordingly, a need exists for improved medical marijuana extracts that can be used in cosmetic, personal care and skin care formulations.

Another area of increased interest in skin care and cosmetic formulations is the use of ozonated oils. Ozonated olive oil and other ozonated oils have been used for their therapeutic effects when topically applied to the skin (e.g., see Kim et al., *J Korean Med Sci* 24: 368-374 (2009); Travagli et al., *Mediators Inflamm.* 2010: 610418 (2010); Pai et al., *Indian J Pharmaceutical Sciences* 76(1): 87-92 (2014); and Montevechi et al., *New Microbiologica* 36: 289-302 (2013)). Ozonated olive oil can exhibit application characteristics, such as pastiness or oiliness, that can have an adverse impact on the widespread acceptance of its use. Further, the production of ozonated olive oils is not standardized, resulting in oils that varying significantly from manufacturer to manufacturer, and sometimes from lot to lot from the same manufacturer. Some commercially available ozonated oils also exhibit a pungent smell that can be off-putting to consumers. There also have been problems associated with ozonated olive oil formulations, such as reported instability attributed to its chlorophyll content and the relatively high concentration of short chain fatty acids relative to long chain fatty acids (see WO 2006/021924, LeRoux, (2006)).

Accordingly, a need exists for improved ozonated oils that can be used in cosmetic, personal care and skin care formulations.

SUMMARY OF THE INVENTION

Exemplary embodiments described herein are directed to oxygenated compositions that include an ozonated coconut oil combined with an oil extract of medical marijuana.

Exemplary embodiments can provide oxygenated formulations that contain an ozonated coconut oil in combination with a non-aqueous extract of medicinal or recreational *Cannabis* for topical application to the skin or mucous membranes.

Exemplary embodiments provide a method of manufacturing an ozonated coconut oil containing ozonides, ozonates or a combination thereof. The process includes treatment of coconut oil with ozone, resulting in a product having greater clarity and higher viscosity than the starting oil. The ozone treatment can result in formation of ozonates, ozonides and other ozone-produced products. Ozonides can result from stabilization of the $O_3$ molecule between double bonds of a monounsaturated fatty acid, such as oleic acid. The primary ozonides (molozonides or 1,2,3-troxolanes) can form via cycloaddition of the alkenes present in the fatty acids or other constituents of the coconut oil. Primary ozonides also can undergo further rearrangements to form secondary ozonides or Criegee ozonides. In addition to the ozonides, secondary and tertiary reaction products resulting from ozone treatment also can be formed. These can include dicarboxylic acids, oxocarboxylic acids peroxides, diperoxides and other lipid hydroperoxides.

Exemplary embodiments provide a method for the production of a non-aqueous extract of medical grade *Cannabis* that includes non-activated or carboxylated cannabinoids.

Exemplary embodiments provide a composition that combines ozonated coconut oil with a non-aqueous extract of medical *Cannabis* resulting in a product that contains tetrahydrocannabinol (THC), CBD and other cannabinoids, which can be in the carboxylated or decarboxylated state, while being substantially free or essentially free of cannabinol (CBN).

Provided are oxygenated *Cannabis* compositions that include an ozonated coconut oil, and a non-aqueous extract of medicinal or recreational *Cannabis* containing tetrahydrocannabinol (THC), wherein the composition is substantially free of cannabinol (CBN). The compositions can be essentially free of CBN. The compositions can include THC in an amount from about 50 mg/mL to about 100 mg/mL. The compositions can further include cannabidiol (CBD). The CBD can present in an amount of from about 50 mg/mL to about 100 mg/mL. When present, the ratio of the amount of THC to the amount of CBD can be from 4:1 to 1:1.

The oxygenated *Cannabis* compositions provided herein can include a cannabinoid acid. The cannabinoid acid can be selected from the group consisting of cannabigerolic acid (CBDA), Δ9-tetrahydrocannabinolic acid (THCA), cannabidiolic acid (CBDA), cannabigervarinic acid (CBGVA), cannabichromenenic acid (CBCA), tetrahydrocanabivarinic acid (THCVA), cannabidivarinic acid (CBDVA), cannabichromevanrinic acid (CBCUA), and a combination thereof. The oxygenated *Cannabis* compositions can include Δ9-tetrahydro-cannabinolic acid (THCA) or cannabidiolic acid (CBDA) or a combination thereof. When present, the amount of cannabinoid acid in the oxygenated *Cannabis* compositions can be from about 0.01 mg/mL to about 10 mg/mL. The oxygenated *Cannabis* compositions also can include a cannabinoid selected from the group consisting of cannabigerol (CBG), cannabigervarin (CBGV), cannabichromene (CBC), tetrahydrocannabivarin (THCV), cannabidivarin (CBDV), cannabichromevanrin (CBCV), and a combination thereof. The additional cannabinoid can be present in the composition in an amount from about 0.01 mg/mL to about 25 mg/mL of the composition.

In the oxygenated *Cannabis* compositions provided herein, the ozonated coconut oil can include an ozonide, an ozonate, a lipoperoxide, an aldehyde, a dicarboxylic acid, an oxocarboxylic acid peroxide, a diperoxide, a lipid hydroperoxide, or a combination thereof. The ozonated coconut oil can include an unsaturated fatty acid. The ozonated coconut oil can include entrapped ozone, where the ozone is in an unreacted form, or in a sequestered form, or as a clathrate, or any combination of these forms. The amount of ozone entrapped in the oil can be from at or about 5 µg/ml to at or about 100 µg/ml. The ozonated coconut oil can release or cause the generation of a reactive oxygen species upon application to the skin or a mucosal membrane. The ozonated coconut oil can trap free radicals or suppress the generation of free radicals in vivo. The ozonated coconut oil can include an ozonated compound capable of passing through a dermis or mucosal surface to the intercellular space to come into contact with a red blood cell or an immunocompetent cell upon application to the dermis or mucosal membrane.

The oxygenated *Cannabis* compositions can contain a ratio of the ozonated coconut oil to the non-aqueous extract of medicinal or recreational *Cannabis* is from about 1.5:1 to about 1:1.5. The oxygenated *Cannabis* compositions can include an additional ingredient selected from among a fragrance, an essential oil, an antimicrobial agent, an antifungal agent, an analgesic, an amphoteric surfactant, an anionic surfactant, a cationic surfactant, a non-ionic surfactant, a zwitterionic surfactant, an excipient, a skin conditioning agent, a hair conditioning agent, a vitamin, a mineral, a plant extract, an anti-inflammatory agent, a UVA/UVB sunscreen, an emollient, a humectants, a moisturizer, a skin protectant, a silicone, a skin soothing ingredient, a solubilizer, an anesthetic, a colorant, a preservative, an anti-oxidant, a pH adjuster, a skin penetration enhancing agent, a skin cleanser, collagen, an oil, a saccharide, a rheology modifier, aloe vera, arrowroot powder, activated charcoal powder, coenzyme Q10, daisy extract, alpha lipoic acid, choline, hyaluronic acid, folic acid, zinc, copper, selenium, magnesium, calcium, potassium, silica, Dead Sea salt, dimethylaminoethanol, L-ascorbic acid, retinol, kojic acid, salicylic acid, alpha hydroxy acid, hydroquinone, and combinations thereof. The total amount of the additional ingredient that can be present is an amount from about 0.01 wt % to about 25 wt % based on the total weight of the composition.

Also provided are pharmaceutically or cosmetically acceptable formulations that include an oxygenated *Cannabis* composition as provided herein, formulated for topical application to a skin surface or to a mucosal surface. The oxygenated *Cannabis* composition can be included in a delivery system selected from among an emulsion, a suspension, a microemulsion, a clear solution, and an anhydrous composition. The oxygenated *Cannabis* composition can be included in a carrier base in the form of a cream, gel, lotion, spray, spray foam, serum, or cosmetic stick. The oxygenated *Cannabis* composition can be included in an impregnated patch, an impregnated strip, a skin surface implant, or an impregnated or coated diaper. The oxygenated *Cannabis* compositions provided herein can be used as a skin moisturizer, a lip balm, a massage oil, a massage oil composition, a cleanser, an anti-aging product, a wrinkle reducer, for healing of damaged muscles, ligaments and tendons, for increasing circulation, or any combination thereof.

Also provided are formulations, such as a skin moisturizer, a lip balm, a massage oil, a massage oil composition, a cleanser, an anti-aging product, a wrinkle reducer that includes the oxygenated *Cannabis* compositions provided herein.

Also provided are methods for treating a skin condition or disease, the methods including applying the oxygenated *Cannabis* composition provided herein to a skin surface. Exemplary skin conditions or diseases include acne, skin wrinkles, skin rash, diaper rash, dry skin, scalp dandruff, darkened skin, broken skin, chafed skin, sunburn, skin damage from UV, skin irritation, or a combination thereof.

Also provided are methods for treating or preventing a dermatological condition, disease or disorder, the methods including applying to a skin surface or a mucosal surface of a subject having the dermatological condition an amount of the oxygenated *Cannabis* composition provided herein, containing from about 50 mg/ml THC to about 500 mg/mL in the range of from 0.5 mL to 50 mL from 2 to 6 times a day. The dermatological condition, disease or disorder can be selected from among acne, actinic keratosis, angioma, aquagenic pruritus, athlete's foot, atopic dermatitis, basal cell carcinoma, bed sores, Behcet's disease, blepharitis, Bowen's disease, bullous pemphigoid, canker sores, carbuncles, cellulitis, chloracne, dyshidrosis, cold sores, creeping eruption, dermatitis, dermatitis herpetiformis, dermatofibroma, diaper rash, eczema, epidermolysis bullosa, erysipelas, erythroderma, genital warts, hidradenitis suppurativa, hives, hyperhidrosis, ichthyosis, impetigo, keloid, keratoacanthoma, keratosis pilaris, lichen planus, lichen simplex chronicus, lipoma, lymphadenitis, malignant melanoma, melasma, miliaria, molluscum contagiosum, nummular dermatitis, pediculosis, pemphigus, perioral dermatitis, photoallergy, *Pityriasis rosea*, *Pityriasis rubra pilaris*, psoriasis, Raynaud's disease, ring worm, rosacea, scabies, scleroderma, sideroderma, sebaceous cyst, seborrheic keratosis, seborrheic dermatitis, shingles, skin cancer, skin tags, spider veins, squamous cell carcinoma, stasis dermatitis, tick bites, *Tinea barbae, Tinea capitis, Tinea corporis, Tinea cruris, Tinea pedis, Tinea unguium, Tinea versicolor, Tinea*, tungiasis, vitiligo, warts and a combination thereof.

Also provided is a method of preparing an ozonated coconut oil, the method including heating a coconut oil to yield a liquid coconut oil; and bubbling ozone through the liquid coconut oil at a rate from at or about 0.05 L/min. to about 1 L/min. for a period of time of at least 24 hours. The bubbling of the ozone can be performed at a rate of from about 0.1 L/min to about 0.5 L/min.

Also provided are methods of preparing a non-aqueous extract of medicinal or recreational *Cannabis*, the method including selecting a medicinal or recreational *Cannabis* plant material containing from about 5% to about 40% THC; freezing the *Cannabis* plant starting material to yield a frozen material; reducing the size of the frozen material to a mean particle size of from about 10 μm to 5,000 μm to yield a finely minced *Cannabis* plant starting material; mixing the finely minced *Cannabis* plant starting material with a coconut oil heated to a temperature of at least 23° C. in order to maintain the oil in a liquid form, the mixing performed until a homogeneous mixture is achieved; increasing the temperature of the homogeneous mixture with mixing until a temperature of from about 60° C. to about 105° C. is achieved; maintaining the homogeneous mixture at 60° C. to about 105° C. for a time of from about 12 hours to 36 hours to yield an infused oil; allowing the infused oil to cool to a temperature from about 24° C. to about 35° C.; and removing the finely minced *Cannabis* plant starting material. The method can include selecting *Cannabis* plant material containing from about 0.5% to about 25% CBD. The method can include freezing the homogeneous mixture after formation of the homogeneous mixture and prior to heating the homogeneous mixture to a temperature of from about 60° C. to about 105° C. The freezing can be performed by placing the homogeneous mixture in bulk into a freezer until the mixture completely freezes, or dropwise adding the homogeneous to liquid nitrogen or to a solution containing an alcohol and solid carbon dioxide to form frozen pellets of the homogeneous mixture.

It is to be understood that both the foregoing general description and the following detailed description are exemplary and explanatory and are intended to provide further explanation of the invention as claimed.

DETAILED DESCRIPTION

The headings used herein are for organizational purposes only and are not meant to limit the scope of the description or the claims in any way.

Definitions

Unless defined otherwise, all technical and scientific terms used herein have the same meaning as is commonly understood by one of skill in the art to which the inventions belong.

All patents, patent applications, published applications and publications, websites and other published materials referred to throughout the entire disclosure herein, unless noted otherwise, are incorporated by reference in their entirety. Where reference is made to a URL or other such identifier or address, it is understood that such identifiers can change and particular information on the internet can come and go, but equivalent information can be found by searching the internet. Reference thereto evidences the availability and public dissemination of such information.

In the event that there are a plurality of definitions for terms herein, those in this section prevail.

As used here, the singular forms "a," "an" and "the" include plural referents unless the context clearly dictates otherwise.

As used herein, the terms "comprising", "including" and "containing" are synonymous, and are inclusive or open-ended. Each term indicates that additional, un-recited elements or method steps optionally can be included.

As used herein, "and/or," means "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described element, event or circumstance does or does not occur, and that the description includes instances where the element, event or circumstance occurs and instances where it does not. For example, an optional component in a formulation means that the component may be present or may not be present in the formulation.

In the examples, and throughout this disclosure, all parts and percentages are by weight (wt %) and all temperatures are in ° C., unless otherwise indicated.

As used herein, the phrase "based on the weight of the composition" with reference to % refers to wt % (mass % or (w/w) %).

As used herein, "mg/mL" refers to milligram of material per milliliter of a fluid composition.

As used herein, "*Cannabis*" refers to any of the plants belonging to the family Cannabaceae, and includes species such as sativa, indica, and ruderalis, or any portion of the plat, such as stalks or stems.

As used herein, "medicinal or recreational *Cannabis*" refers to *Cannabis* having a THC concentration greater than 1%. This is commonly referred to as marijuana. Some strains can contain from about 10% to about 40% THC, as contrasted to hemp, which contains a very low concentration of THC (typically 0.3% or less).

As used herein, "ozonated water" refers to distilled or deionized water treated with or exposed to ozone. The ozone can be produced, e.g., using an ozone generator, and the treatment or exposure can be accomplished by any method that brings the material into contact with ozone, such as by injecting or bubbling ozone into a fluid material, or flooding a surface of a fluid or solid material with ozone.

As used herein, "ozonation" refers to a process in which a material has been treated with ozone has been bubbled through a material. As used herein as a verb, "ozonate" refers to treating a material with ozone.

As used herein, an "ozonated product" is a material that has gone through an ozonation process.

As used herein, an "ozonate" as used as a noun refers to an ozonated product, which can include partially or completed oxidized products produced by exposure to ozone, as well as complexes, sequestered forms or as clathrates of ozone.

As used herein, "THC" refers to tetrahydrocannabinol.
As used herein, "CBD" refers to cannabidiol.
As used herein, "CBN" refers to cannabinol.
As used herein, a "reactive oxygen species" refers to chemically reactive chemical species containing oxygen. Many reactive oxygen species have an unpaired electron. Examples include the superoxide $O_2^-$. and hydroxyl HO. radicals, peroxides, singlet oxygen, and alpha-oxygen.

As used herein, "bud material" refers to the flower of the *Cannabis* plant. A bud material can include each individual calyx as well as the cola, which is a bundle of flowers that grow closely together, trichomes, any calyx or bract, pistils, and any underlying supporting structures and related leaves. Bud material can be fresh or cured.

As used herein, a "masking agent" is one or a combination of chemical compounds that can conceal the presence of a substance within a formulation.

As used herein, the term "essentially free" of a compound means the compound is present in an amount of 0.1 wt % or less in a formulation.

As used herein, the term "substantially free" of a compound means the compounds is present in an amount of 1 wt % or less in a formulation.

As used herein, a "clathrate" refers to a compound in which molecules of one component, such as ozone, are physically trapped within the structure of another compound, or within the structure formed by the interaction of molecules of one or more compounds.

It should also be understood that, unless clearly indicated to the contrary, in any methods claimed herein that include more than one step or act, the order of the steps or acts of the method is not necessarily limited to the order in which the steps or acts of the method are recited.

Reference will now be made in detail to an embodiment of the present invention, an example of which is illustrated in the accompanying drawings.

Methods for Producing Ozonated Coconut Oil

Ozonation of an oil results in the decrease in its natural color, and can result in an oil that is colorless or water-clear. Ozone can react with double bonds of some fatty acids in oils and oxidize them, or can result in ozonide formation. Ozonide formation allows the reactive oxygen to be incorporated into the triglycerides of the coconut oil, or other alkene components of the oil. The ozone chemically reacts with unsaturated C=C bonds in constituent components of the coconut oil resulting in therapeutically active ozonated derivatives. Any olefin in the coconut oil can react with ozone to form an ozonide:

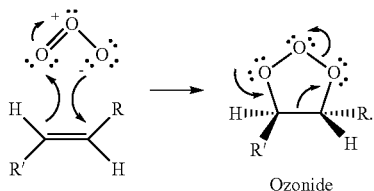

Ozonide

The resulting ozonide-containing compositions have the ability to deliver nascent oxygen without causing primary skin irritation associated with direct ozone treatment of the skin or mucosal tissues.

Ozonation also can result in complete or partial oxidation of chemical components to yield ozonates. Examples include dicarboxylic acids, oxocarboxylic acids peroxides, diperoxides and other lipid hydroperoxides, aldehydes and ketones, as well as changes in the amount and type of fatty acids naturally present in an oil before ozonation. Ozonation also can result in the formation of entrapped ozone, such as by being in a sequestered form surrounded by components of the starting material or ozonates thereof, or in a form of a clathrate, where reaction products or components of the starting material constrain the ozone in a cage or lattice of host molecules. The clathrate can reduce ozone interaction with other components, thereby rendering it stable, and releasing it upon use.

Ozone treatment can impart a sweet and pungent odor, often described as like chlorine, an electric train or metallic, to the product. Such odors can linger after completion of the ozone treatment, but can be masked by addition of an appropriate fragrance or masking agent.

Coconut oil has fewer unsaturated fatty acids than olive oil, which is the oil traditionally used to make ozonated oil. For example, olive oil contains, in its triacylglycerols, about 55% to about 82% of the monounsaturated omega-9 fatty acid oleic acid (C18:1), about 4% to about 21% of the polyunsaturated omega-6 fatty acid linoleic acid (C18:2), and up to about 1.5% of the polyunsaturated omega-3 fatty acid alpha-linolenic acid C18:3). The proportion of oleic acid to linoleic and linolenic acids is much higher in olive oil than other vegetable oils. This renders olive oil more resistant to oxidation. The majority of fatty acids in olive oil are long-chain fatty acids, and olive oil is low in saturated fats.

Coconut has a distribution of fatty acids in its triacylglycerols significantly different from that of olive oil. Coconut oil is high in saturated fats, with the dominant saturated fatty acid is lauric acid (C12), which makes up about 48% of the fatty acid content of coconut oil. Coconut oil is about 65% medium chain fatty acids. Only about 7% of the fatty acid content of coconut oil is oleic acid (C18:1).

Ozonated olive oil can have a very high viscosity, resulting in a composition having a paste-like consistency that can make it difficult or unpleasant to apply to the skin. Ozonated oil also can leave a sticky residue and seems to take a long time to penetrate the skin or to be absorbed after application. In contrast, ozonated coconut oil can exhibit a lower viscosity. When manually applied to the skin, ozonated coconut oil rolls smoothly and appears to penetrate more effectively, leaving the skin feeling refreshed and clean.

The coconut oil used as a starting material can be unrefined coconut oil. Unrefined coconut oil is also referred to as "virgin" coconut oil, and it can be extracted from fresh coconuts. The extraction process can be a cold-press process or the extraction can be performed at ambient temperatures. The extraction process can impart some thermal energy to the coconut during processing. The coconut oil used as a starting material can be refined coconut oil. Refined coconut oil can be extracted from coconuts that first are baked or from dried copra, not fresh coconuts. The coconut oil can be organic or non-organic. The coconut oil can have melting point of about 24° C.

High melting point coconut oil (36° C.-40° C.), which is achieved by hydrogenation of the coconut oil, is not used alone as a starting material in the methods provided herein. High melting point coconut oil can be used in an amount of 25 wt % or less, or 20 wt % or less, 15 wt % or less, or 10 wt % or less, or 5 wt % or less.

The coconut oil used as a starting material can be a synthetic coconut oil. Any synthetic coconut oil can be used.

An exemplary synthetic coconut oil can be prepared by mixing together 0-1 wt % caproic (C10 hexanoic) acid, 5-10 wt % caprylic (C8 octoic) acid, 6-10 wt % capric (C10 decoic) acid, 42-55 wt % lauric (C12 dodecanoic) acid, 12-20 wt % myristic (C14 tetradecanoic) acid, 7-12 wt % palmitic (C16 hexadecanoic) acid, 0.5-3.5 wt % stearic (C18 n-octadecanoic) acid, 4-10 wt % oleic (C18:1) acid, 0-1.5 wt % linolenic (C18:3) acid, and 0-0.5 wt % arachidic (C20 eicosanoic) acid. Synthetic coconut oil can be used alone or in combination with unrefined or refined coconut oil or a combination thereof.

The coconut oil is placed into a container made of glass or stainless steel or a container than has an interior coating of an inert or non-reactive coating, such as polytetrafluoroethene (PTFE) or hydrogenated carbon. Using a glass or stainless steel container, or a container having a contiguous non-reactive coating on its interior surfaces, can help avoid unwanted contamination during the process. For example, a plastic container or plasticizers in the plastic container can react with ozone release unwanted chemicals into the oil. The configuration of the container can be selected to accommodate the volume or amount of oil to be ozonated. The container can be a cylinder, hopper, tank, or other geometry. The container can have a flat top, or dished top or cone top, and any one of these can be used in combination with a flat bottom or a dished bottom. Depending on batch size to be processes, the container can be of a size sufficient to contain from 1 liter to 5000 liters.

The container can be sealed completely in order to control flow of ozone within the container and exiting the container. Any type of seal compatible with exposure to ozone can be used. For example, the seal can be made of a material such as polytetrafluoroethylene (PTFE, such as Teflon® from Chemours), filled PTFE, such as Durlon® 9000 (Gasket Resources, Inc.) polyvinylidene fluoride (PVDF, such as Kynar® PVDF from Arkema), a thermoplastic vulcanizate (such as Santoprene™ from ExxonMobil Chemical), or a fluorosilicone.

In some configurations, the container can include an inlet for admitting ozone into the container and an outlet for allowing gases to exit the container. The inlet and the outlet can be located in the top of the container. When the inlet is located in the top of the container, a conduit can be included to allow the ozone to travel to the bottom of the container. The conduit can be or include a tube, hose or pipe configured to carry the ozone from the inlet at the top of the container to the bottom of the container.

The inlet can include a hole for an adaptor fitting to connect the tube, hose or pipe. The size of the tube, hose or pipe can be based on the size of the container and the flow rate of ozone to be introduced into the container. The size of the adaptor can range from about ⅜" up to about 4" or more depending on the size of the container used in the process, and the tube, hose or pipe attached to the inlet is sized accordingly. The container can vary from a size of 5 liters to 5,000 liters. The tube, hose or pipe is attached to the inlet in a manner to provide a fluid-tight seal. If necessary, an ozone-compatible sealing material can be included between the inlet and the tube, hose or pipe to provide the fluid-tight seal.

Typically, one end of the conduit is attached to one or a plurality of injectors to inject ozone into the oil. The injectors can be positioned in locations at the bottom of the container to allow the ozone to be dispersed over a wide area of the bottom of the container. The injector can be a diffuser, which can be known as a bubbler. In some configurations, the outlet can be located in the top of the container, and an inlet can be located in the bottom of the container, with the inlet connected to a conduit within the container connected to a diffuser that allows the ozone to be dispersed over a wide area of the bottom of the container. The connectors can be a silicon or fluorosilicone hose. The diffuser can include a rigid porous or perforated material. The diffuser can discharge the ozone in the form of fine bubbles. The ozone bubbles can rise through the liquid coconut oil, interacting with the coconut oil and thereby ozonating the coconut oil. The diffuser surface density per unit of container area can be planned in advance of installation of the equipment by spacing diffusers at different intervals along the bottom of the container or at different intervals along the ozone supply conduit. The diffuser can have any known shape, such as disc, doughnut or tubular designs, or combinations thereof. The diffuser can be made of any material compatible with ozone. Examples include diffusers made glass, stainless steel, stone, silicone or fluorosilicone.

The conduit can be a channel engineered into a sidewall of the container. The conduit can or include be a tube, pipe or hose. The conduit can be compatible with ozone. The tube, pipe or hose can be positioned to extend from the top to the bottom of the container near the center of the container. The tube, pipe or hose can be positioned to extend from the top to the bottom along a sidewall of the container. The arrangement can allow a mixer to be inserted into the center of the container to allow mixing during ozone treatment. When present, the mixer can be a single shaft agitator mixer. The mixer can include one or more than one axial flow impeller, radial flow impeller, tangential flow propeller, or combinations thereof. The impeller that can have any configuration, such as paddle, propeller, flat blade disc turbine, pitch blade turbine, retreat curve impeller, helical ribbon, double spiral, anchor impeller or combinations thereof.

The container also can include an access opening through which the coconut oil can be added into the container. In some configurations, the access opening for adding the coconut oil is in the top of the container. In some configurations, the access opening for adding the coconut oil is on a sidewall of the container. The access opening also can be used for sanitizing purposes, such as to allow access to the interior of the container for cleaning and disinfecting the container between batches.

The inlet can be connected to an ozone generator. The connection can be made via ozone-compatible hoses, such as silicone or fluorosilicone hoses.

The container can include one or more heaters disposed on the sidewalls, bottom, or on the sidewalls and bottom of the container. The heaters allow heating of the coconut oil within the container during processing. Induction or resistance heating can be used. For example, an induction coil can be configured about the outer perimeter of the container to provide thermal energy. Resistance heaters, which typically include a resistance heating alloy wire, can be configured to conform to the shape of the container to heat the coconut oil within. A steam or hot water jacket also can be used to surround the container in order to heat the contents of the container. Heating pads can be used on the sides of the container to heat the contents of the container. The heaters are used to maintain the coconut oil in a liquid form during ozone treatment. The heaters can provide sufficient thermal energy so that the coconut oil within the container has a temperature greater than its melting temperature. In some embodiments, the coconut oil I heated to a temperature in the range of from about 23° C. to about 50° C., and maintains the coconut oil in a liquid state during processing.

The container is sealed during processing. Sealing the container can allow for better retention of heat within the container during processing. Heat retention can lead to less heating to be required during processing. The heater can have sufficient power to melt the coconut oil if placed in the container in its solid state (below its melting point).

The amount of coconut oil added to the container is limited only by the capacity of the container. The amount of coconut oil added can be such that head space is maintained between the top of the container and the upper surface of the coconut oil within the container. The headspace maintained at the top of the container can result in venting of gases from the container without loss or leakage of treated coconut oil. The headspace can accommodate any foam generated during the process. In some configurations, the headspace can be from about 20% to about 40% of the total volume of the container.

Once the coconut oil has been placed in the container, and the heaters have provided sufficient heat to melt the coconut oil so that it is in a liquid state, the access opening is sealed and ozone is produced to be introduced into the container via the inlet. The ozone can be generated by any known method. While ozone can be produced inexpensively using a corona discharge ozone generator, corona discharge typically produce lower quantities of ozone-containing products, and can produce unwanted compounds that inadvertently could be introduced into the coconut oil during ozone treatment. To avoid this, a cold plasma generator, which produces high quantities of ozone more efficiently with minimal unwanted product generation, can be used to provide ozone to the process.

Because ozone generation using dried air can result in the formation of nitric acid and nitric oxides and other nitrous by-products during ozonation, ozone production can be performed using an oxygen concentrator method that removes all or almost all of the nitrogen from the feed gas. The use of oxygen as the feed gas instead of dried air permits a more efficient production of the ozone, since an ozone generator using oxygen feed gas can produce about twice the ozone as the same sized generator if dried air is used instead. For example, ozone generators using dried air typically can only make about 2-4 wt % ozone, while ozone generators using oxygen can produce from about 5-15 wt % ozone. Accordingly, the ozone for the ozonation of the coconut oil can be produced and provided to the contained using an ozone generator connected to an oxygen concentrator. For example, the ozone can be produced by an ozone generator (O3Elite Single Stage Ozone Generator, Promolife, Inc., Fayetteville, AR) in combination with a Philips Respironics 1020000 EverFlo Home Oxygen Concentrator (Philips Respironics, Murrysville, PA).

The oxygen concentrator can be activated to provide a flow of oxygen that can be fed into the ozone generator. The ozone generator converts the oxygen into ozone, which is then delivered to the reaction container via appropriate tubing, hoses or pipes, which are connected to the inlet of the reaction container. The inlet can be connected to tubing, hoses or pipes inside the reaction chamber, which transport the ozone to the bottom of the reaction chamber. The end of the tubing, hoses or pipes at the bottom of the reaction chamber is attached to one or more diffusers, directly or via a manifold or distribution hub. The diffusers can convert the ozone into small bubbles. If a mixer is used for mixing the coconut oil within the reaction chamber during processing, any mixing is performed at a low speed, such as from about 0.5 rpm to about 50 rpm, to promote long residence time of the ozone bubbles in the oil as the bubbles traverse from the bottom to the top of the coconut oil in the reaction container. The length of time of infusion of ozone into the coconut oil can vary depending on the volume of the coconut oil in the reaction container and the flow rate of the ozone. The time of ozone infusion can vary from about 12 hours to about 170 hours.

The flow rate of ozone introduced into the reaction container should be at least 0.05 L/min. The flow rate of ozone introduced into the reaction container can be from about 0.05 L/min to about 1 L/min, or from about 0.1 L/min to about 0.5 L/min. The ozone can be introduced at a steady rate, or the flow rate of ozone can be changed in a step-wise fashion during the time period of ozone treatment, or the flow rate of ozone can be changed in a gradual incremental or decreasing fashion during the time period of ozone treatment. It has been determined that lower flow rates over a longer period of time can result in a higher concentration of ozone, ozonides and/or ozonates in the final product than can be achieved using higher ozone flow rates for shorter periods of time.

An exemplary exposure protocol using step changes in the ozone flow rate can include an ozone flow to the inlet of the reaction chamber of 0.5 liters per minute (L/min) for a time period of 3 hours, followed by an ozone flow of 0.25 L/min for 5 hours, followed by an ozone flow of 0.1 L/min for about 22 hours. An exemplary exposure protocol using a gradual decrease in the ozone flow rate can include an initial ozone flow to the inlet of the reaction chamber of 0.5 liters per minute (L/min) for a time period of 1 hour, followed by decrease in the ozone flow of 0.01 L/min every 5 minutes until a final flow rate of 0.1 L/min is achieved, and then holding the flow rate at 0.1 L/min for a total ozone reaction time of 22 hours. An exemplary exposure protocol using a steady ozone flow rate includes delivering the ozone to the reaction chamber at a flow rate of 0.2 L/min for a time period of 25 hours.

The level of ozone trapped in the oil can be at least 5 μg/ml, or at least 10 μg/ml, or at least 15 μg/ml, or at least 20 μg/ml, or at least 25 μg/ml, or at least 30 μg/ml, at least 35 μg/ml, at least 40 μg/ml, or at least 45 μg/ml, or at least 50 μg/ml, or at least 55 μg/ml, or at least 60 μg/ml, or at least 65 μg/ml, or at least 70 μg/ml, or at least 75 μg/ml. The level of ozone in the oil can be from at or about 5 μg/ml to at or about 100 μg/ml. The level of ozone in the oil can be from at or about 10 μg/ml to at or about 80 μg/ml.

Excess ozone and reaction gases can exit the top of the oil into the headspace of the reaction container. Excess ozone and reaction gases can be exhausted as off-gases through the outlet. The outlet can be connected to one or more hoses, tubes or pipes that direct the off-gases into a waste container filled with water to trap or neutralize any unreacted ozone. After bubbling through the water in the waste container, the gases can be released into the atmosphere. The water can be treated as wastewater and discarded.

Once the coconut oil has been treated by infusing the coconut oil with ozone, the resulting product can contain ozonides and/or ozonates. The ozonated coconut oil can be used for preparation of the final skin care product at this stage. The ozonated coconut oil can be stored under refrigeration until needed for use to make the final skin care composition. For example, the ozonated coconut oil can be moved to a processing tank by a pump designed to transport oil through a piping system, where the pump and piping system are compatible with ozone. The ozonated coconut oil can be dispensed into appropriate transport containers, such as stainless steel buckets or other transport containers compatible with ozone and manually or mechanically transported to the tank for preparation of the skin care composition.

The coconut oil in its original state before ozone treatment in its liquid state can have a slight yellow tint and is translucent to transparent, while in its solid state it can have a white to a slightly yellow color, and has a coconut fragrance. After ozonation, the ozonated oil in its liquid form is clear and colorless. In its solid form, the ozonated coconut oil has a bright white color. The ozonated coconut oil no longer has a strong coconut smell, but has a pure or fresh or "after a rain storm" aroma or "clean sanitized" scent due to the ozonation process.

Method for Producing the *Cannabis*-Infused Oil

Another component of the skin care compositions provided herein is a non-aqueous extract of medical/recreational grade *Cannabis*. Unlike CBD oil from hemp, which is extracted from the hemps seeds, the compositions provided herein include a non-aqueous extract of *Cannabis* plants, particularly an extract form the buds, although some portion of leaf material also can be included in the extraction process. The *Cannabis* plants used for preparing the extract can be a single strain or multiple strains of *Cannabis* plants. The starting material can be harvested from Sativa plants, Indica dominant plants, or a combination thereof. The starting material can be harvested from plants that are hybrids that contain a ratio of both Sativa and Indica characteristics. The *Cannabis* plants used can contain a combination of cannabinoids. The main cannabinoid acids present in the medical/recreational grade *Cannabis* plant are cannabigerolic acid (CBDA), Δ9-tetrahydrocannabinolic acid (THCA), cannabidiolic acid (CBDA), cannabigervarinic acid (CBGVA), cannabichromenenic acid (CBCA), tetrahydrocanabivarinic acid (THCVA), cannabidivarinic acid (CBDVA), and cannabichromevanrinic acid (CBCUA). The most abundant cannabinoid acid present in *Cannabis* is Δ9-Tetrahydrocannabinolic acid (THCA) and cannabidiolic acid (CBDA).

The *Cannabis* strains used for preparing the extract can contain from 5% to 40% THC, or from 10% THC to 35% THC. The strains used can contain between 0.5% CBD up to 25% CBD.

The *Cannabis* plants used for extraction are legally grown medicinal and recreational *Cannabis* varieties or strains. The *Cannabis* plants can be grown indoors and outdoors. The *Cannabis* plants can be grown under natural light, or under synthetic lighting, or under a combination of natural and synthetic lighting. The *Cannabis* plants can be grown in green houses with natural light. The *Cannabis* plants can be grown in green houses with natural light and with synthetic lights supplementation. The *Cannabis* plants can be grown in soil, coco, or rockwool. The *Cannabis* plants can be cultivated using aeroponics or aquaponics. The *Cannabis* plants can be watered and fed with natural or organic or synthetic nutrients. The *Cannabis* plants can be fed with natural composts or natural fertilizer teas.

The *Cannabis* plant starting material can contain about 5 wt % to about 50 wt % leaf material. The starting material can contain about 50 wt % to about 95 wt % bud material. For some preparations, a lower percentage of leaf material can be used. The starting material can include about 50 wt % bud material, or about 55 wt % bud material, or about 60 wt % bud material, or about 65 wt % bud material, or about 70 wt % bud material, or about 75 wt % bud material, or about 80 wt % bud material, or about 85 wt % bud material, or about 90 wt % bud material, or about 95 wt % bud material. The starting material can include less than about 40 wt % leaves, or less than about 35 wt % leaves, or less than about 30 wt % leaves, or less than about 25 wt % leaves, or less than about 20 wt % leaves, or less than about 15 wt % leaves, or less than about 10 wt % leaves, or less than about 5 wt % leaves. Bud size can range from about 1 cm up to about 15 cm in diameter.

The *Cannabis* plant starting material can be fresh after harvesting, or can be dried before being used, or can be cured before being used for preparing the extract, or can be any combination of fresh, dried and/or cured plant starting material. The *Cannabis* starting material is not exposed to high irradiances of UV light after harvesting, as the UV light can damage the trichomes and the terpenes and other compounds therein. For example, exposure of the harvested *Cannabis* plant starting material to a UV irradiance of 400 mW/cm$^2$ or greater for a time period of 10 minutes or greater should be avoided. Similarly, while surface exposure with ozone can be used as a way to reduce contamination by bacteria or mold, excess exposure of the plant starting material to ozone can result in damage to or complete destruction of the terpenes and cannabinoids.

Drying and curing can change the physical and chemical attributes of the plant material. The most obvious change can be a reduction in the amount of moisture in the cured product compared to the freshly harvested material. Drying and curing the *Cannabis* plant starting material can result in reduction of moisture content of the starting plant material by 75 wt % to 95 wt %, or up to 99.5 wt % reduction in moisture, so that the final material contains from about 0.5 wt % to 11 wt % moisture. The freshly harvested material can be from about 7 to about 10 times heavier than the same material after drying, or after drying and curing. For example, a freshly harvested *Cannabis* plant starting material that weights 10 kg wet weight can weigh about 1.5 to 2 kg after drying and curing. The *Cannabis* plant starting material can be cured for a week or more, or at least 2 weeks, or up to 6 weeks before preparing the extract.

Drying of the *Cannabis* starting material can be done in any closed ventilated space, depending on the amount of material to be dried, from a large box fitted with a fan to a closet or small room with a circulation system. Ventilation can help prevent or reduce condensation of any moisture removed from the plant material that could promote the growth of mold and bacteria on the plant material, rending the material useless.

Temperatures greater than 145° C. and light should be avoided during the drying process. Temperatures greater than 145° C., which sometimes can be used to speed a drying process for typical agricultural products, are to be avoided as elevated temperatures can result in decarboxylation of the cannabinoids and can damage cannabinoids. Exposure to temperatures greater than 145° C., and/or exposure to light can also degrade the THC into cannabinol (CBN). Instead, lower temperatures using a dehumidifier are used. A hygrometer is used to measure humidity in the closed space, with a fav or other venting system that can remove or circulate the air or atmosphere during the drying process. A UVC or other sterilizing system also can be used to decrease mold and microorganisms and reduce contamination during the drying process. A filtration system also can be used to remove any particulates or mold spores from the drying atmosphere within the closed space during the drying process. An activated carbon filter also can be used to trap and remove any odors.

An exemplary method for drying the *Cannabis* starting material uses an air conditioner to maintain a temperature of about 18° C. to 21° C. in the drying area. A dehumidifier can be used to maintain humidity between 45 to 50%. If the humidity is allowed to reach 55% or higher, the growth of fungi and bacteria on damp material can occur. If the humidity is 44% or lower, the rapid rate of moisture loss from the *Cannabis* starting material can cause the material to dry on the outside forming a barrier while the inside remains moist. One or more oscillating circulating fans can be used to keep the air moving throughout the drying space.

In order to expedite drying, the *Cannabis* starting material can be hung upside down from the stalk to maximize the surface area of the plant material exposed to the drying atmosphere. Lighting can be reduced during the drying process. In some embodiments, the drying is performed in the dark. A red light or other low energy source can be used to allow inspection during the drying process. The drying process can last for one to three weeks depending on the size, weight, and moisture content of the starting material, and the temperature, humidity and circulation within the chamber. Drying is deemed to be complete when the moisture content of the material is reduced to at or less than about 12 wt % moisture. If the material is to be cured, the final moisture level can be in the range of from about 0.5 wt % to about 11 wt %. As the *Cannabis* starting material dries, the color and weight may change. As the chlorophyll degrades during drying, the green color can fade and hints of yellow, brown, red and purple can become more prominent. The dried material can be lime green, dark green, green purple, green yellow, green red, purple, and purple green yellow. Also, the odor can become more pungent.

The dried starting material can be used to make the *Cannabis* coconut oil infusion product. Alternatively, the dried starting material can be subjected to a curing process. During the curing process, chemical changes can occur, modifying some of the components of the starting material and yielding a product with modified taste and smell attributes. For example, some of the terpenoids may volatilize or undergo polycyclic aromatization. Cannabigerol can be converted to tetrahydrocannabinol (THC). Tetrahydrocannabinolic acid can be converted to THC. Slow curing preserves the amount of terpenes and can slow or avoid decarboxylation.

Curing can be achieved by removing any leaves from the *Cannabis* bud material and placing the material in glass jars that are maintained in a climate-controlled environment. The curing can be done at a constant temperature and relative humidity so the bud material can lose water at a stable, slow pace. Exemplary curing condition include a temperature of about 18° C. to about 21° C. and a humidity of from 40% to 50%. Curing can be done for at least 10 days and up to about 4 month. Typically curing is done for about 10 days to about 30 days. During curing, the moisture level of the material can go from about 35 wt % moisture to a moisture of about 11 wt % or less. A target final moisture content can be in the range of from about 0.5 wt % to about 11 wt %. The curing process can result in a material with increased THC, higher levels of terpenes and increased total cannabinoids. Curing can be done in low light levels, such as 25 lux or less, or 15 lux or less, or 10 lux or less, or 5 lux or less. In some embodiments, drying can be done in no light. Exposure to light containing UV can be reduced or prevented, as the UV can degrade the cannabinoids and terpenes. For example, polymer films that reduce or prevent transmission of UV light can be used to reduce or prevent UV light from coming into contact with the drying material.

The *Cannabis* plant starting material can be or can include fresh buds cut directly from the stalk without any curing. When fresh cut material is used, the moisture content, which can be 90 wt % or more, must be taken into account when determining the amounts of *Cannabis* starting material to be used. The starting material can contain about 50 wt % to about 95 wt % fresh bud material. The starting material can include about 50 wt % fresh bud material, or about 55 wt % fresh bud material, or about 60 wt % fresh bud material, or about 65 wt % fresh bud material, or about 70 wt % fresh bud material, or about 75 wt % fresh bud material, or about 80 wt % fresh bud material, or about 85 wt % fresh bud material, or about 90 wt % fresh bud material, or about 95 wt % fresh bud material. The size of the fresh buds can range from about 1 cm up to about 15 cm in diameter. As discussed above, the drying and curing process can result in chemical changes in the *Cannabis* starting material, so using only fresh buds, or blends of fresh buds with dried or cured material, can result in a product with a different overall content of terpenes and cannabinoids.

The *Cannabis* plant has trichomes that produce and contain cannabinoids, as well as terpenes, terpenoids, and flavonoids. Careful handling of the *Cannabis* plants during growth and harvesting, and during post-harvest processing, can reduce damage to the trichomes. Reducing the amount of physical contact can lead to more trichomes remaining attached to the plant material. Accordingly, in exemplary embodiments, the *Cannabis* plants can be touched as little as possible. In some embodiments, nitrile gloves or other protective wear covering the hands can be worn while handling the plant material.

The *Cannabis* plant starting material can be subjected to reduced temperatures in order to freeze the plant materials. For example, the *Cannabis* plant starting material can be placed in a freezer maintained at a temperature of from about 0° C. or less, or from about −18° C. or less. The *Cannabis* plant starting material also can be frozen by exposing it to liquid nitrogen. Liquid nitrogen has a boiling point of about −196° C. Freezing can help to disrupt the trichomes that contain the active cannabinoids without damaging the cannabinoids. Freezing can help make the cannabinoids more readily available during the extraction process. The length of time required to completely freeze the *Cannabis* plant material using a freezer can depend on the thickness of the plant material, circulation of the cold air within the freezer, type of freezer, and other factors such as packing of the material (outer layers can act as thermal barriers reducing heat loss). Any type of freezer can be used. Examples of freezers include a mechanical freezer, air blast freezers, cold storage freezers, box freezers, shock freezers, belt freezers, spiral belt freezers, fluidized bed freezers, IQF or tunnel freezers, immersion freezers, and cryogenic freezers. This freezing process can be performed for a period of time of at least 3 hours, or at least 6 hours, or at least 12 hours. The freezing process can last for a period of time from about 1 hour to about 170 hours.

The *Cannabis* plant starting material also can be frozen by exposing the plant material to liquid nitrogen. The plant material can be immersed in liquid nitrogen. Alternatively, the liquid nitrogen can be applied to the plant material. When liquid nitrogen is used to freeze the plant material, the times to achieve frozen plant material can be significantly reduced compared to the times needed when a freezer is used. For example, when plants are immersed in liquid nitrogen, they can be completely frozen within 10 seconds to 180 seconds.

After the conclusion of the freezing process, the frozen *Cannabis* plant starting material can be used for the extraction process, or the frozen plants can be stored in their frozen state and used for extraction at a future date.

The frozen *Cannabis* plant starting material can be broken down into smaller pieces. The breaking down process can be done using food grade safe processing conditions. It is not necessary to reduce the frozen plant material into a powder. In some embodiments, the plant material can be reduced in size to a finely minced material. The mean particle size after processing can be 5,000 µm, or 2,500 µm, or 1,000 µm, or 750 µm, or 500 µm, or 250 µm, or 100 µm, or 75 µm, or 50 µm, or 25 µm, or 10 µm Any device capable of reducing the size of the frozen *Cannabis* plant starting material can be used. For example, primary impact crushers, secondary crushers, cage mills, hammer mills, pulverizers, grinders, blenders, food processors, or any combination thereof can be used. Stainless steel equipment can be used to reduce contamination. Size reduction can be done at room temperature (about 20° C. to 25° C.) or can be performed at a reduced temperature, such as 4° C., or 0° C., or less than 0° C. The reduced temperature can help to reduce trichome accumulation on the size reduction device. The size reduction device can include one or more blades. The blades can have a perforated or ridged edge, which can reduce attachment and accumulation of the sticky trichomes on the edges of the blade. In some embodiments, processing conditions can be selected to cause as little damage to the individual trichomes as possible. In some embodiments, the closer the trichomes are to their original form the better. The freezing process can help aid in the separation of whole trichomes.

The size reduction device can be pre-cooled prior to use. For example, frozen carbon dioxide (dry ice) can be passed through a size reduction device to reduce its temperature. Alternatively, liquid nitrogen can be applied to the size reduction device. To reduce heating during size reduction, frozen plant material can be maintained in the freezer or in the liquid nitrogen until being placed in the size reduction device. Particles of dry ice also can be passed through the size reduction device along with the plant material, or periodically between providing plant material. Doing so can help maintain the temperature of the size reduction device low. Such a process also can reduce frictional heating that could be produced during the size reduction process.

Finely minced *Cannabis* plant starting material then can be mixed into coconut oil. The coconut oil can be heated to a temperature at or above its melting point prior to mixing in the *Cannabis* plant starting material. In some embodiments, the coconut oil is heated to a temperature of at least about 24° so that the coconut oil is in a liquid state. The coconut oil can be virgin unrefined coconut oil or refined coconut oil or a blend thereof. The amount of minced *Cannabis* plant to coconut oil can be varied. In some embodiments, a ratio of *Cannabis* plant material to coconut oil from about 1:10 to about 1:20 is used in the extraction process. The ratio of *Cannabis* plant material to coconut oil can be 1:10, or 1:10.5, or 1:11, or 1:11.5, or 1:12, or 1:12.5, or 1:13, or 1:13.5, or 1:14, or 1:14.5, 1:15, or 1:15.5, or 1:16, or 1:16.5, or 1:17, or 1:17.5, or 1:18, or 1:18.5, or 1:19, or 1:19.5, or 1:20. For example, 224 g of cured *Cannabis* plant material can be mixed with 2240 g of coconut oil, or 224 g of cured *Cannabis* plant material can be mixed with 3500 g of coconut oil, or 224 g of cured *Cannabis* plant material can be mixed with 4440 g of coconut oil. When fresh *Cannabis* plant is used, higher amounts of the fresh material can be used to account for the increased moisture in the fresh material compared to the dried or cured material. For example, fresh material can contain up to 95 wt % moisture, and thus a moisture content can be measured and an appropriate increase in the weight of the starting material can be used.

During the extraction process, the mixture can be stirred. A mixer can be used to stir the mixture. The stirring can be continuous, or can be intermittent. The stirring can be performed for anywhere from about 25% to about 100% of the extraction. The mixer can be a single shaft agitator mixer. The mixer can include one or more than one axial flow impeller, radial flow impeller, tangential flow propeller, or combinations thereof. The impeller can have any configuration, such as paddle, propeller, flat blade disc turbine, pitch blade turbine, retreat curve impeller, helical ribbon, double spiral, anchor impeller or combinations thereof. Multiple mixers can be used. The mixers can be configured to achieve the desired mixing flow characteristics. In some embodiments, the stirring can be performed to achieve a homogeneous mixture. Mixing can be carried out for a time from about 5 minutes to about 60 minutes.

After the stirring is complete, the stirred mixture can be exposed to a reduced temperature to freeze the mixture prior to thermal extraction processing, or the stirred mixture can be subjected to thermal extraction processing directly without freezing the mixture.

To freeze the mixture, the mixture can be placed into a freezer until the mixture completely freezes. The mixture can be frozen by added the mixture dropwise to liquid nitrogen or a mixture containing an alcohol and solid $CO_2$ (dry ice) to form pellets of the frozen mixture. Once frozen, the mixture can be maintained in a frozen state. In some embodiments, the mixture can be maintained in a frozen state for 12 to 36 months. In some embodiments, the frozen mixture can be maintained in a frozen state for a period of time from 1 hour to 24 hours. For use, after being maintained in a frozen state for at least 1 hour, the mixture can be warmed until the mixture melts and can be stirred.

The mixture (whether frozen and melted, or used directly after stirring is completed) then can be heated to extract the oil-soluble components of the plant material into the coconut oil. The oil extraction process to infuse the oil with the oil soluble components of the *Cannabis* plants can be performed at a temperature of from about 24° C. to about 50° C. The coconut oil *Cannabis* extraction process can be done in an appropriate vessel equipped for temperature control of the materials within the vessel. In exemplary embodiments, at a small scale, the vessel can be a stainless steel butter churner having a water jacket for temperature control (e.g., available from Bob-White Systems, South Royalton, VT), a stainless steel, glass or ceramic digital food cooker (e.g., Cuisinart 6.5 quart programmable slow cooker). In embodiments for larger scale production (50 L to 5,000 L or more), stainless-steel vats, liquid hoppers, fermenters or containers fitting with heaters that can be controlled to modulate the temperature of the contents within can be used. Temperature controlled ceramic vessels also can be used.

Any type of heaters can be used to provide temperature control. Induction or resistance heating can be used. For example, an induction coil can be configured about the outer perimeter of the container to provide thermal energy. Resistance heaters, which typically include a resistance heating alloy wire, can be configured to conform to the shape of the container to heat the coconut oil within. Heating pads containing resistance heaters can be wrapped or clamped around the vessel in order to provide temperature control via heat energy input. A steam or hot water jacket can be used to surround the container in order to heat the contents of the container. The heaters can be used to maintain the coconut oil in a liquid form during *Cannabis* extraction. During the extraction, lipophilic and fat-soluble components of the *Cannabis* plant material can be infused into the coconut oil.

The heaters can provide sufficient thermal energy so that the coconut oil within the container has a temperature greater than its melting temperature, or a temperature in the range of from about 23° C. to about 50° C.

The extraction process can be performed at a single temperature, such as a temperature of from about 60° C. to about 100° C. In some embodiments, it has been found that a more efficient extraction can be achieved when a stepped temperature profile or a ramped temperature gradient extraction profile is used. The extraction can be performed for a time from about 6 hours to about 36 hours. An extraction temperature exceeding 107° C. can result in decarboxylation during processing or damage to the plant material. When fresh bud material is used as a starting material instead of dried bud material or cured bud material, the fresh buds can be mixed with the melted coconut oil at about the melting temperature of the coconut oil (about 23° C.) for from 10 minutes to 60 minutes before heat is added to increase the extraction temperature.

In an exemplary step gradient profile, the mixture of liquid coconut oil and pulverized frozen *Cannabis* plant material is heated to a temperature of about 40° C. and maintained at 40° C. for 2 hours. After 2 hours, the temperature is increased to 65° C. and maintained at 65° C. for 4 hours. After being held at 65° C. for 4 hours, the temperature is increased to 80° C. and maintained at 80° C. for 10 hours.

In an exemplary ramp temperature profile, after the *Cannabis* plant material is completely mixed with the melted liquid coconut oil to form a mixture, the temperature can be programmed to increase from a starting temperature of about 25° C. to a temperature of about 105° C. at a rate of 0.25° C./minute, or 0.5° C./minute, or 0.75° C./minute, or 1° C./minute. Once the temperature has reached 105° C., the mixture can be held at 105° C. for from 1 to 10 hours, and then a reverse cooling ramp can be used to reduce the temperature from 105° C. to about 25° C. The temperature can be reduced at a rate of 0.25° C./minute, or 0.5° C./minute, or 0.75° C./minute, or 1° C./minute. In some embodiments, the mixture is a homogeneous mixture.

These temperature strategies can be selected to heat the mix consistently without overheating, burning or destroying the trichomes. The cannabinoid acid present in the trichomes can undergo a decarboxylation reaction during the extraction of the cannabinoids from the *Cannabis* plants into the coconut oil if too high a temperature is used. Decarboxylation will neutralize any cannabinoid acids. Cannabinoid acids convert to cannabinoids after decarboxylation. The cannabinoids present in the extract after decarboxylation can include cannabigerol (CBG), Δ9-tetrahydrocannabinol (THC), cannabidiol (CBD), cannabigervarin (CBGV), cannabichromene (CBC), tetrahydrocannabivarin (THCV), cannabidivarin (CBDV) and cannabichromevanrin (CBCV). If cannabinol (CBN) is present, it is due to the degradation and oxidization of Δ9-tetrahydrocannabinol (THC). Controlling the processing temperature during the drying, curing, and extraction process can reduce or eliminate the production of CBN. The compositions provided herein are substantially free of CBN.

As the extraction process proceeds, the odor of the coconut oil can change from a slight coconut odor to fresh pine tree and coconut smell, being faint at the beginning of the extraction process and increasing in strength as the process proceeds. At the end of the extraction process, the *Cannabis* infused coconut oil can have an aroma that can be characterized as one or a combination of sweet, fruity, earthy, sharp herbal, skunky, and pine smell. The color of the extract can be dark greenish yellow or olive green.

After completion of the extraction process and the oil is allowed to cool to a temperature of from about 24° C. to about 35° C., the plant material is removed from the infused oil. The plant material can be removed by any appropriate method. The plant material can be removed via filtration or centrifugation. When filtration is used, a micron filter or a combination of micron filters can be used to remove the plant material. The average size of the openings in the micron filter or between pieces of the filter media can be 250 μm or less. The average size of the openings can be 250 μm or less, or 200 μm or less, or 150 μm or less, or 100 μm or less, or 50 μm or less. The average size of the openings can be from about 5 μm to about 175 or from about 10 μm to about 160 or from about 15 μm to about 150 μm or from about 25 μm to about 125 μm.

The infused oil can contain one or more terpenes. The terpene can be selected from among α-bisabolol, borneol, camphene, camphor, 3-carene, caryophyllene oxide, β-caryophyllene, α-cedrene, citronellol, p-cymene, eucalyptol, fenchol, geraniol, geranyl acetate, guaiol, α-humulene, isoborneol, (−)-isopulegol, limonene, linalool, menthol, myrcene, nerolidol, ocimene, phellandrene, phytol, α-pinene, β-pinene, R-(+)-pulegone, sabinene, α-terpinene, terpinen-4-ol, α-terpineol, 4-terlineol, terpinolene, valencene and combinations thereof. The total amount of terpenes in the composition can be from about 0.01 mg/mL to about 100 mg/mL.

The infused oil can contain one or more flavonoids. The flavonoid can be selected from among apigenin, cannflavin A, cannflavin B, isovitexin, kaempferol, luteolin, orientin, quercetin, β-sitosterol, vitexin, and combinations thereof. The total amount of flavonoids in the composition can be from about 0.01 mg/mL to about 100 mg/mL.

After filtration or centrifugation, the infused oil can be clear and can be a dark greenish yellow or olive green color. The infused oil has a smooth hand-feel when applied to the skin, it can be free of grit or lumps, and when applied to the skin can appear to be readily absorbed. The filtration or centrifugation can remove particles that otherwise can make the infused oil feel gritty or grainy, and can cause the infused oil to be opaque, translucent or cloudy. The infused oil now can be added to the oxygenated coconut oil to produce the oxygenated *Cannabis* composition, or can be stored in glass or stainless steel vessels for future use.

Final Mixing to Yield Oxygenated *Cannabis* Extract Composition

The ozonated coconut oil is mixed with the *Cannabis* infused coconut oil to yield the oxygenated *Cannabis* extract composition. The oils are maintained at a temperature at which both oils are liquid and remain liquid when mixed. After this stage has been completed, the oils can be transported to the final infusion tank. Any mixer can be used to combine the two oils together. The mixer can be a single shaft agitator mixer. The mixer can include one or more than one axial flow impeller, radial flow impeller, tangential flow propeller, or combinations thereof. The impeller can have any configuration, such as paddle, propeller, flat blade disc turbine, pitch blade turbine, retreat curve impeller, helical ribbon, double spiral, anchor impeller or combinations thereof. The mixer can be sized appropriately for the size of the batch to be mixed. The configuration of the mixer can be selected to reduce bubble formation during mixing, or can be selected to entrain air to form a mousse-like composition.

The amount of *Cannabis* infused oil mixed with the ozonated coconut oil can be in the range of from about 1.5:1 to about 1:1.5. This allows for a standardized final formulation that has an amount of THC from about 50 mg/mL to about 300 mg/mL Different batches of *Cannabis* infused oil can be prepared and blended together to yield a *Cannabis* infused oil that contains the targeted amounts of THC and CBD that when blended with the ozonated coconut oil produce a product with the targeted amounts of the cannabinoids. For examples, blends can be prepared that when mixed with a targeted amount of oxygenated coconut oil produce a product that contains equal amounts of THC and CBD, such as from about 50 mg/mL to about 300 mg/mL THC and from about 50 mg/mL to about 300 mg/mL CBD.

An ethanol extract, a of *Cannabis* plant material, a hydrocarbon extract of *Cannabis* plant material, or a carbon dioxide supercritical extract of *Cannabis* plant material, or a combination of any two of these extracts also can be added to the blend containing the *Cannabis* infused oil mixed and the ozonated coconut oil to increase the concentration of one or more constituents. For example, an ethanol extract can contain cannabinoids and terpenes, and can be used to increase the final concentration of these components in the blend containing the *Cannabis* infused oil mixed and the ozonated coconut oil. Ethanol extraction can be done using heat to remove the ethanol, but the heating process can result in decarboxylation of the cannabinoids. Heating during extraction also can result in extractions of waxes from the plant material. Ethanol extraction at room temperature or under supercooled conditions can allow for extraction of cannabinoids that are carboxylated. The room temperature or supercooled ethanol extraction also allows for extraction of terpenes and flavonoids. Another advantage of the room temperature or supercooled ethanol extraction process is that it can be used to produce THCa crystals. Depending on the temperature conditions and *Cannabis* plant starting material used, 100 mL of ethanol can extract about 100 g THC. The process can be varied by not only varying the extraction temperature, but by varying the ratio of ethanol to plant material, and the equipment used for the extraction process. In some processes, from about 5 L to about 20 L ethanol is used per 1 kg of *Cannabis* plant material for the extraction.

Hydrocarbon extraction and carbon dioxide supercritical extraction can be used to extract specific compounds from the *Cannabis* plant starting material. Hydrocarbon extraction can use butane, isobutane, propane or a blend thereof as a solvent. The resulting product often is referred to as hash oil. Hydrocarbon extraction can extract the cannabinoids and terpenes from the *Cannabis* plant starting material. Hydrocarbon extraction can be used to produce a crystalline cannabinoid extract that can be separated from terpenes extracted from the *Cannabis* plant material. The temperatures used during extraction can be manipulated to minimize the amount of wax or chlorophyll extracted in the solvent. The resulting extract then can be combined with the blend containing the *Cannabis* infused oil mixed and the ozonated coconut oil provided herein to increase the final concentration of one or more targeted constituents.

Carbon dioxide supercritical extraction uses carbon dioxide as a solvent. Carbon dioxide supercritical extraction allows for targeted extraction of specific components of targeted classes of components from the *Cannabis* plant material. The targeting can be achieved by adjusting the density of the carbon dioxide liquid, and/or its polarity (such as by addition of one or more co-solvents). The supercritical carbon dioxide process can be used to target extraction of only cannabinoids, or only terpenes, or only carotenoids, or only flavonoids, or any combination thereof. The resulting extract then can be combined with the blend containing the *Cannabis* infused oil mixed and the ozonated coconut oil provided herein to increase the final concentration of one or more targeted constituents. Carbon dioxide supercritical extraction can be used to extract THC or THCa.

Methods of ethanol extraction, supercritical carbon dioxide, and supercritical hydrocarbon extraction are known in the art. For example, see U.S. Pat. No. 8,895,078 (Mueller, 2014); U.S. Pat. No. 9,034,396 (Zheng et al., 2015); U.S. Pat. No. 9,399,180 (Ellis et al., 2016); U.S. Pat. No. 9,649,349 (Tucker et al., 2017); U.S. Pat. No. 9,782,691 (Chess et al., 2017); U.S. Pat. No. 9,815,810 (Ogilvie et al., 2017); U.S. Pat. No. 9,950,976 (Keller, 2018); and U.S. Pat. No. 9,919,241 (Auerbach et al., 2018); and U.S. Pat. App. Pub. Nos. US2013/0079531, Barringer, 2013); US2017/0240840, Privitera et al., 2017); US2017/0360745 (Blackmon et al., 2017); US2017/0360861 (Humphreys et al., 2017); and US2018/0362429 (Zhang et al., 2018).

The amount of any of the ethanol extract, hydrocarbon extract or carbon dioxide supercritical extract added to the blend containing the *Cannabis* infused oil and the ozonated coconut oil provided herein can depend on which target constituent is to be augmented by adding the ethanol extract, the hydrocarbon extract or the carbon dioxide supercritical extract, or any combination thereof. For example, an amount of an ethanol extract, a hydrocarbon extract, a carbon dioxide supercritical extract, or any combination thereof can be added in an amount sufficient to increase the amount of THC or THCa in the blend containing the *Cannabis* infused oil and the ozonated coconut oil provided herein to a level of up to about 500 mg/mL THC or THCa or a combination thereof. An ethanol extract, a hydrocarbon extract, a carbon dioxide supercritical extract, or any combination thereof can be added to a composition that include the blend containing the *Cannabis* infused oil and the ozonated coconut oil provided herein in amount from about 0.05 wt % to about 15 wt % based on the total weight of the composition.

The ratio of cannabis infused oil to the ozonated coconut oil can be from about 1.5:1 to about 1:1.5. For some formulations, equal amounts (a ratio of 1:1) of *Cannabis* infused oil and ozonated coconut oil can be mixed together to yield the final product. Mixing can be performed for the amount of time necessary to yield a homogenous product. The mixing time can depend on the batch size to be mixed, and the power and configuration of the mixer(s). For typical batch sizes, homogeneous mixing can be achieved with mixing for a time from about 15 minutes to 60 minutes.

Additional Ingredients

Additional ingredients also can also be included in the oxygenated *Cannabis* extract compositions. The total amount of additional ingredients that can be included can be from about 0.01 wt % to about 25 wt % based on the total weight of the composition. The additional ingredients can be one or more selected from, but not limited to, fragrances and essential oils, antimicrobial agents, antifungal agents, analgesics, amphoteric surfactants, anionic surfactants, cationic surfactants, non-ionic surfactants, zwitterionic surfactants, excipients, skin and/or hair conditioning agents, vitamins, minerals, plant extracts, anti-inflammatory agents, UVA/UVB sunscreens, emollients, humectants, moisturizers, skin protectants, silicones, skin soothing ingredients, solubilizers, anesthetics, colorants, preservatives, anti-oxidants, pH adjusters, skin penetration enhancing agent, skin cleansers, collagen, avocado oil, macadamia nut oil, shea butter, apricot oil, aloe vera, arrowroot powder, activated charcoal powder, vitamins, coenzyme Q10, daisy extract, alpha lipoic acid, choline, hyaluronic acid, folic acid, zinc, copper, selenium, magnesium, calcium, potassium, silica, Dead Sea salt, dimethylaminoethanol, L-ascorbic acid, retinol, kojic acid, salicylic acid, alpha hydroxy acid, hydroquinone, and combinations thereof.

Essential oils and other fragrances can be included in the oxygenated *Cannabis* extract compositions. The amount of essential oil added can depend on the strength of fragrance desired. The total amount of one or more essential oils or fragrances that can be included in the oxygenated *Cannabis* extract compositions is from about 0.01 wt % to about 10 wt % based on the total weight of the composition. Exemplary essential oils include, but are not limited to, organic citrus aurantifolia oil (organic lime oil), organic citrus Aurantium dulcis peel oil expressed (organic orange oil), lemon essential oil, organic Rosmarinus officinalis leaf oil (organic rosemary oil), tangerine essential oil, and combinations thereof.

A skin penetration enhancing agent can be included in the oxygenated *Cannabis* extract compositions. A total amount of one or more skin penetration enhancing agents that can be included in the oxygenated *Cannabis* extract compositions is from about 0.01 wt % to about 5 wt % based on the total weight of the composition. The skin penetration enhancing agent can be selected from, but is not limited to, an ester of a hydroxy acid, trimethyl citrate, triethyl citrate, tributyl citrate, acetyl triethyl citrate, acetyl tributyl citrate, trihexyl citrate, butyl trihexyl citrate, stearyl citrate, methyl lactate, ethyl lactate, propyl lactate, isopropyl lactate, butyl lactate, isobutyl lactate, t-butyl lactate, pentyl lactate, neopentyl lactate, isopentyl lactate, hexyl lactate, ethylhexyl lactate, glycerol lactate, benzyl lactate, diethyl tartrate, dimethyl tartrate, ethyl mandelate, ethyl salicylate, methyl salicylate, ethyl glycolate, and combinations thereof. Any ester of a hydroxy acid can be included as a skin penetration enhancing agent. Examples include, but are not limited to, the methyl, ethyl, propyl, isopropyl, butyl, pentyl, octyl, decyl and dodecyl esters of any acid selected from the group consisting of glycolic acid, methyl lactic acid, 2-hydroxybutanoic acid; 2-hydroxypentanoic acid; 2-hydroxyhexanoic acid; 2-hydroxyheptanoic acid; 2-hydroxyoctanoic acid; 2-hydroxynonanoic acid; 2-hydroxy-decanoic acid; 2-hydroxyundecanoic acid; 2-hydroxydodecanoic acid; 2-hydroxytetra-decanoic acid; 2-hydroxyhexadecanoic acid; 2-hydroxyoctadecanoic acid; 2-hydroxy-eicosanoic acid; 2-hydroxytetraeicosanoic acid; and 2-hydroxytetraeicosenoic acid, and combinations thereof.

One or more excipients can be included in the oxygenated *Cannabis* extract compositions provided herein. Exemplary excipients include antioxidants, fatty alcohols, ethoxylated fatty alcohols, oils, phospholipids, ceramides, hyaluronic acid, fatty ester emollients, humectants, surface active agents, mineral oil, petrolatum, waxes and silicone-containing waxes, silicone oil, silicone fluid, silicone surfactants, volatile hydrocarbon oils, quaternary nitrogen compounds, amine functionalized silicones, conditioning polymers, saccharides and rheology modifiers. The total amount of one or excipients that can be included in the oxygenated *Cannabis* extract compositions is from about 0.01 wt % to about 10 wt % based on the total weight of the composition.

Representative saccharides and rheology modifiers include agarose, amylopectins, amyloses, arabinans, arabinogalactans, arabinoxylans, carrageenans, gum arabic, carboxymethyl guar gum, carboxymethyl cellulose, carboxymethyl(hydroxypropyl) guar gum, hydroxyethyl guar gum, cationic guar gum, cellulose ethers including methyl cellulose, chondroitin, chitins, chitosan, chitosan pyrrolidone carboxylate, chitosan glycolate, chitosan lactate, cocodimonium hydroxypropyl oxyethyl cellulose, corn starch, curdlan, dextrans, furcellarans, dextrans, cross-linked dextrans, dextrin, emulsan, ethyl hydroxyethyl cellulose, flaxseed saccharide (acidic), galactoglucomannans, galactomannans, glucomannans, glycogens, guar gum, hydroxy ethyl starch, hydroxypropyl methyl cellulose, hydroxy ethyl cellulose, hydroxy propyl cellulose, hydroxypropyl starch, hydroxypropylated guar gums, gellan gum, gellan, gum ghatti, gum karaya, gum tragacanth, heparin, hyaluronic acid, inulin, keratin sulfate, konjac mannan, modified starches, laminarans, laurdimonium hydroxypropyl oxyethyl cellulose, okra gum, oxidized starch, pectic acids, pectin, polydextrose, polyquaternium-4, polyquaternium-10, polyquaternium-28, potato starch, protopectins, psyllium seed gum, pullulan, sodium hyaluronate, starch diethylaminoethyl ether, steardimonium hydroxyethyl cellulose, raffinose, rhamsan, tapioca starch, levan, scleroglucan, sodium alginate, stachyose, succinoglycan, wheat starch, xanthan gum, xylans, xyloglucans, and mixtures thereof. The total amount of one or more saccharides and/or rheology modifiers that can be included in the oxygenated *Cannabis* extract compositions is from about 0.01 wt % to about 10 wt % based on the total weight of the composition.

Oils can act as emollients and also can impart viscosity and hand feel, such as cling, tackiness, and drag properties to cosmetic and pharmaceutical compositions. Examples of suitable oils include caprylic triglycerides; capric triglyceride; isostearic triglyceride; adipic triglyceride; propylene glycol myristyl acetate; lanolin; lanolin oil; polybutene; isopropyl palmitate; isopropyl myristate; isopropyl isostearate; diethyl sebacate; diisopropyl adipate; tocopheryl acetate; tocopheryl linoleate; hexadecyl stearate; ethyl lactate; cetyl oleate; cetyl ricinoleate; oleyl alcohol; hexadecyl alcohol; octyl hydroxystearate; octyl dodecanol; wheat germ oil; hydrogenated vegetable oils; castor oil; petrolatum; modified lanolins; branched-chain hydrocarbons; alcohols and esters; corn oil; cottonseed oil; olive oil; palm kernel oil; rapeseed oil; safflower oil; jojoba oil; evening primrose oil; avocado oil; mineral oil; shea butter; octyl palmitate; maleated soybean oil; glycerol trioctanoate; diisopropyl dimerate; and volatile and non-volatile silicone oils including phenyl trimethicone. The total amount of one or more oils that can be included in the oxygenated *Cannabis* extract compositions is from about 0.01 wt % to about 20 wt % based on the total weight of the composition.

Applications and Methods

The oxygenated *Cannabis* extract compositions provided herein can be included in a delivery system, and can be used in methods for the treatment of many diseases or conditions. The oxygenated *Cannabis* compositions provided herein can be included in a delivery system such as an emulsion, a suspension, a microemulsion, a clear solution, or anhydrous compositions.

The oxygenated *Cannabis* compositions provided herein can be included in a carrier base in the form of a cream, gel, lotion, spray, spray foam, serum, or cosmetic stick. The oxygenated *Cannabis* compositions provided herein can be included in an impregnated patch, impregnated strip, skin surface implant, impregnated or coated diaper, or similar delivery or packaging form.

The oxygenated *Cannabis* extract compositions provided herein can be used as a skin moisturizer, a massage oil, for facials, as a cleanser, as an anti-aging product, as a wrinkle reducer, for healing of damaged muscles, ligaments and tendons, for increasing circulation, The present invention discloses a method for treating skin conditions that include acne, skin wrinkles, skin rash including diaper rash, dry skin, scalp dandruff, darkened skin, broken skin, chafed skin, sunburn, skin damage from UV, skin irritation, or a combination thereof, via topical application of the oxygenated *Cannabis* compositions provided herein.

The oxygenated *Cannabis* extract compositions provided herein can be useful in the treatment or prevention of a variety of different dermatological conditions, diseases or disorders, including, but not limited to, acne, actinic keratosis, angioma, aquagenic pruritus, athlete's foot, atopic dermatitis, basal cell carcinoma, bed sores, Behcet's disease, blepharitis, Bowen's disease, bullous pemphigoid, canker sores, carbuncles, cellulitis, chloracne, dyshidrosis, cold sores, creeping eruption, dermatitis, dermatitis herpetiformis, dermatofibroma, diaper rash, eczema, epidermolysis bullosa, erysipelas, erythroderma, genital warts, hidradenitis suppurativa, hives, hyperhidrosis, ichthyosis, impetigo, keloid, keratoacanthoma, keratosis pilaris, lichen planus, lichen simplex chronicus, lipoma, lymphadenitis, malignant melanoma, melasma, miliaria, molluscum contagiosum, nummular dermatitis, pediculosis, pemphigus, perioral dermatitis, photoallergy, *Pityriasis rosea*, *Pityriasis rubra pilaris*, psoriasis, Raynaud's disease, ring worm, rosacea, scabies, scleroderma, sideroderma, sebaceous cyst, seborrheic keratosis, seborrheic dermatitis, shingles, skin cancer, skin tags, spider veins, squamous cell carcinoma, stasis dermatitis, tick bites, *Tinea barbae, Tinea capitis, Tinea corporis, Tinea cruris, Tinea pedis, Tinea unguium, Tinea versicolor, Tinea*, tungiasis, vitiligo, and warts.

The oxygenated *Cannabis* extract compositions provided herein can be particularly suitable for use as a cosmeceutical or pharmaceutical. The compositions can penetrate through the skin and can deliver oxygen or oxygen species in situ. The compositions can have an effect conditioning the skin. It can be used daily, and can be allowed to remain on the skin for extended periods, such as overnight or for several days, or can be applied an left to absorb and not be removed. The oxygenated *Cannabis* extract compositions can be applied by hand or by using an applicator, such as a cotton ball, a cotton swab or a pad. The oxygenated *Cannabis* extract compositions can be impregnated into a wipe for application to a target area. The oxygenated *Cannabis* extract compositions can be used to prepare medical dressings and wound coverings for external application to the surface of skin, burns or wounds.

The oxygenated *Cannabis* extract compositions can be administered by application of from 0.5 mL to 50 mL to a skin surface or mucosal surface from 2 to 6 times a day.

The oxygenated *Cannabis* extract compositions can be formulated in various cosmetic and pharmaceutical consumer products utilizing a variety of delivery systems and carrier bases. Such consumer product can include after shaves, bath oil, bath oil bars, bath oil beads, bath oil salts, bar soaps, liquid soaps, shower gels, bubble baths, body and hand lotions, skin creams, skin conditioner, personal lubricant, tooth paste, mouth spray, mouth wash, massage oil, masks, serum, solid cosmetic sticks, lip balm, shaving creams, shampoo, hair conditioner, hair detangling lotion, styling gel, styling glazes, spray foams, styling creams, styling waxes, styling lotions, mousses, spray gels, pomades, spritzes, ointments, sunscreens, balms and salves. The oxygenated *Cannabis* compositions provided herein can be used as a skin moisturizer, a lip balm, a massage oil, a massage oil composition, a cleanser, an anti-aging product, a wrinkle reducer, for healing of damaged muscles, ligaments and tendons, for increasing circulation, or any combination thereof.

EXAMPLES

Example 1

An oxygenated *Cannabis* product was prepared using organic virgin coconut oil and Diamond Og strain of *Cannabis*, which is a indica strain.

The organic virgin coconut oil was heated to liquefy the oil. About 7.57 L (2 U.S. gallons) liquid virgin coconut oil was placed a 26.5 L capacity (7 gallon capacity) glass container. Heating pads were placed and secured onto the sides of the glass container so that the entire circumference of the container was covered by the heating pads. Each heating pad included a thermostat controller that was set to maintain the temperature of the coconut oil within the glass container between 26° C. and 38° C. in order to maintain the oil in liquid form during the entire ozonation process.

One end of a silicone tube was connected to a ceramic bubbling stone. The end of the silicone tube connected to the bubbling stone was placed into the container through the top of the glass container and positioned so that the bubbling stone was located on the bottom of the container. The opposite end of the silicone tube was connected to an ozone generator (O3Elite Single Stage Ozone Generator, Promolife, Inc., Fayetteville, AR). An oxygen concentrator (Philips Respironics 1020000 EverFlo Home Oxygen Concentrator (Philips Respironics, Murrysville, PA) was connected to the ozone generator. The oxygen concentrator was set to provide a flow rate of 0.5 L/min. The oxygen concentrator supplied oxygen through the silicone tube and into the ozone generator, and the ozone generator was activated, converting the oxygen ($O_2$) into ozone ($O_3$). The flow rate of oxygen to the ozone generator was maintained at 0.5 L/min.

Ozone was bubbled through the liquid coconut oil continuously for 48 hours to yield the ozonated coconut oil. The resulting product was clear and colorless, and when solidified has a bright white color. The oil has a scent of rain after a thunderstorm, and a slight pungent ozone aroma. It had a smooth hand-feel, applied to the skin easily and was easily absorbed.

A *Cannabis* coconut oil infusion then was prepared. The *Cannabis* infusion process was performed in a heated ceramic food slow cooker (Cuisinart 6.5 quart programmable slow cooker). Unrefined or virgin coconut oil was heated to liquefy the oil. About 7.57 L (2 U.S. gallons) liquid virgin coconut oil was placed in the food slow cooker. Dry *Cannabis* bud material was prepared by subjecting the dried cured *Cannabis* bud material to a shear force in a blender with a stainless steel 4-point blade and blended until the *Cannabis* bud material was broken down into a fine powder.

Then 448 g of the powdered dry *Cannabis* bud material was added to the coconut oil with mixing. The coconut oil then was heated to a temperature of 65° C. and maintained at 65° C. for a period of 24 hours with intermittent or constant stirring. After completion of the 24 hours of heating, the heat was turned off and the *Cannabis* infused coconut oil was allowed to cool for 20 min. while mixing. After the cooling period, the *Cannabis* infused coconut oil was filtered through a micron mesh to remove any residual insoluble *Cannabis* bud material. To facilitate filtration, different mesh size filters were used, starting with a 225 micron filter, followed by a 100 micron filter, then a 50 micron filter, and finally a 25 micron filter. The *Cannabis* bud material removed by the filters was discarded.

The filtered *Cannabis* infused coconut oil had a sweet, fruity, earthy, sharp herbal, skunky, pine smell and dark greenish yellow or olive green color. It had a smooth hand-feel, applied to the skin easily and was readily absorbed.

The cosmetic composition containing the ozonated coconut oil and the filtered *Cannabis* infused coconut oil then was prepared. The ozonated coconut oil was mixed with the filtered *Cannabis* infused coconut oil at a ratio of 1:1. An aliquot of 4.6 kg ozonated coconut oil at a temperature of 30° C. was placed in a pre-heated stainless steel vessel of a mixer fitted with a paddle mixing blade. The mixer was energized to begin mixing of the ozonated coconut oil, maintaining the temperature at 30° C. An aliquot of 4.6 kg of the *Cannabis* infused coconut oil at a temperature of 30° C. then slowly was added with mixing to the ozonated coconut oil to the ozone-infused coconut oil. After all of the *Cannabis* infused coconut oil was added to the ozonated coconut oil, the mixture was mixed constantly for 15 to 25 minutes to yield a homogeneous blend.

Additional ingredients can be added to the homogeneous blend at this point. For this batch, 0.8 kg citrus essential oil blend (Citrus Burst Synergy Blend essential oil, available from Mountain Rose Herbs Mercantile, Eugene, OR) was added with mixing to impart a light citrus scent. The product contained 46 wt % ozonated coconut oil, 46 wt % ozone-infused coconut oil, and 8 wt % essential oil.

The final product had an aroma described as pure and fresh like a brand new clean sanitized scent with a citrus back drop. The *Cannabis* smell was present but faint, and there was a slight ozone aroma, pungent and sharp chlorine-like smell, but faint enough to not be distinct, reminiscent of the smell of rain after a thunderstorm. The aroma opens the nasal passage as it is crisp and oxygenating giving the feeling of rejuvenation, and was pleasant, being smooth and easy to breathe in.

The texture of the final product was a soft cream/oil, feeling soft, smooth and silky, with no perceptible lumps or grit. The color was a light whitish green. The product is bright and somewhat opaque and has a sheen to it. The texture is soft smooth and silky. The product spread on the skin evenly and absorbed into the skin. When applied to the skin, the product absorbed deep into the epidermis providing a cleaning and purifying sensation. While applied on the skin, it is light, like water, feeling as though there is no heavy oil, and although aware that the oil was applied, there was a light clean feel to it. During testing, a very slight tingle after application to the skin was noted, as the oil penetrated and was absorbed by the skin.

In user trials, a 5 mL aliquot of the ozonated coconut *Cannabis* infusion product was found to fully absorb into the skin in about 35 min. to 40 min. when applied to the face or to the neck area. Trial users indicated that the product was refreshing and left the skin feeling moisturized but not oily.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An oxygenated *Cannabis* composition, comprising:
    an ozonated coconut oil; and
    a non-aqueous extract of medicinal or recreational *Cannabis* containing tetrahydrocannabinol (THC), wherein:
    the composition is substantially free of cannabinol (CBN); and
    the THC is present in an amount up to about 500 mg/mL.

2. The composition of claim 1, further comprising cannabidiol (CBD) present in an amount of from about 50 mg/mL to about 300 mg/mL.

3. The composition of claim 2, wherein a ratio of the amount of THC to the amount of CBD of from 4:1 to 1:1.

4. The composition of claim 1, further comprising:
    (a) a cannabinoid acid selected from the group consisting of cannabigerolic acid (CBDA), Δ9-tetrahydrocannabinolic acid (THCA), cannabidiolic acid (CBDA), cannabigervarinic acid (CBGVA), cannabichromenenic acid (CBCA), tetrahydrocanabivarinic acid (THCVA), cannabidivarinic acid (CBDVA), cannabichromevanrinic acid (CBCUA), and a combination thereof, wherein the cannabinoid acid is present in an amount of from about 0.01 mg/mL to about 10 mg/mL; or
    (b) an additional cannabinoid selected from the group consisting of cannabigerol (CBG), cannabigervarin (CBGV), cannabichromene (CBC), tetrahydrocannabivarin (THCV), cannabidivarin (CBDV), cannabichromevanrin (CBCV), and a combination thereof, wherein the additional cannabinoid is present in an amount from about 0.01 mg/mL to about 25 mg/mL; or
    (c) both (a) and (b).

5. The composition of claim 1, wherein the ozonated coconut oil comprises:
    (a) an ozonide, an ozonate, a lipoperoxide, an aldehyde, a dicarboxylic acid, an oxocarboxylic acid peroxide, a diperoxide, a lipid hydroperoxide, or a combination thereof; or
    (b) an unsaturated fatty acid; or
    (c) an entrapped ozone, wherein the ozone is in an unreacted form, or in a sequestered form, or as a clathrate, or any combination of these forms, and the amount of ozone entrapped in the oil is from at or about 5 µg/ml to at or about 100 µm/ml or
    (d) an ozonated compound capable of passage through a dermis or a mucosal surface; or
    (e) any combination of (a) to (d).

6. The composition of claim 1, wherein a ratio of the ozonated coconut oil to the non-aqueous extract of medicinal or recreational *Cannabis* is from about 1.5:1 to about 1:1.5.

7. The composition of claim 1, further comprising an additional ingredient selected from among a fragrance, an essential oil, an antimicrobial agent, an antifungal agent, an analgesic, an amphoteric surfactant, an anionic surfactant, a cationic surfactant, a non-ionic surfactant, a zwitterionic surfactant, an excipient, a skin conditioning agent, a hair conditioning agent, a vitamin, a mineral, a plant extract, an anti-inflammatory agent, a UVA/UVB sunscreen, an emollient, a humectants, a moisturizer, a skin protectant, a silicone, a skin soothing ingredient, a solubilizer, an anesthetic, a colorant, a preservative, an anti-oxidant, a pH adjuster, a skin penetration enhancing agent, a skin cleanser, collagen, an oil, a saccharide, a rheology modifier, aloe vera, arrowroot powder, activated charcoal powder, coenzyme Q10, daisy extract, alpha lipoic acid, choline, hyaluronic acid, folic acid, zinc, copper, selenium, magnesium, calcium, potassium, silica, Dead Sea salt, dimethylaminoethanol, L-ascorbic acid, retinol, kojic acid, salicylic acid, alpha hydroxy acid, hydroquinone, and combinations thereof, wherein the additional ingredient is present in an amount from about 0.01 wt % to about 10 wt % based on the total weight of the composition.

8. The composition of claim 1, further comprising:
(a) one or more than one terpene selected from among a-bisabolol, borneol, camphene, camphor, 3-carene, caryophyllene oxide, β-caryophyllene, a-cedrene, citronellol, p-cymene, eucalyptol, fenchol, geraniol, geranyl acetate, guaiol, a-humulene, isoborneol, (-)-isopulegol, limonene, linalool, menthol, myrcene, nerolidol, ocimene, phellandrene, phytol, α-pinene, β-pinene, R-(+)-pulegone, sabinene, α-terpinene, terpinen-4-ol, α-terpineol, 4-terlineol, terpinolene, valencene, and combinations thereof, or (b) one or more than one flavonoid selected from among apigenin, cannflavin A, cannflavin B, isovitexin, kaempferol, luteolin, orientin, quercetin, β-sitosterol, vitexin, and combinations thereof; or
(c) both (a) and (b).

9. The composition of claim 1, further comprising:
(a) an ethanol extract of *Cannabis* plant material, wherein an amount of the ethanol extract present in the composition is from 0.05 wt % to about 15 wt % based on the weight of the composition; or
(b) a hydrocarbon extract of *Cannabis* plant material, wherein an amount of the hydrocarbon extract present in the composition is from 0.05 wt % to about 15 wt % based on the weight of the composition; or
(c) a supercritical carbon dioxide extract of *Cannabis* plant material, wherein an amount of the supercritical carbon dioxide extract present in the composition is from 0.05 wt % to about 15 wt % based on the weight of the composition; or
(d) any combination of (a) to (c).

10. A pharmaceutical or cosmetic formulation, comprising the oxygenated *Cannabis* composition of claim 1, for topical application to a skin surface or to a mucosal surface.

11. The formulation of claim 10, wherein the oxygenated *Cannabis* composition is included in:
(a) a delivery system selected from among an emulsion, a suspension, a microemulsion, a clear solution, and an anhydrous composition; or
(b) a carrier base in the form of a cream, gel, lotion, spray, spray foam, serum, or cosmetic stick; or
(c) an impregnated patch, an impregnated strip, a skin surface implant, or an impregnated or coated diaper.

12. A method for treating a dermatological condition, disease or disorder, comprising applying to a skin surface or a mucosal surface of a subject having the dermatological condition an amount of the formulation of claim 10 in a range of from 0.5 mL to 50 mL from 2 to 6 times a day, wherein the dermatological condition, disease or disorder is selected from among acne, actinic keratosis, angioma, aquagenic pruritus, athlete's foot, atopic dermatitis, basal cell carcinoma, bed sores, Behcet's disease, blepharitis, Bowen's disease, broken skin, bullous pemphigoid, canker sores, carbuncles, cellulitis, chafed skin, chloracne, cold sores, creeping eruption, dermatitis, dermatitis herpetiformis, dermatofibroma, diaper rash, darkened skin, dry skin, dyshidrosis, eczema, epidermolysis bullosa, erysipelas, erythroderma, genital warts, hidradenitis suppurativa, hives, hyperhidrosis, ichthyosis, impetigo, keloid, keratoacanthoma, keratosis pilaris, lichen planus, lichen simplex chronicus, lipoma, lymphadenitis, malignant melanoma, melasma, miliaria, molluscum contagiosum, nummular dermatitis, pediculosis, pemphigus, perioral dermatitis, photoallergy, *Pityriasis rosea, Pityriasis rubra pilaris*, psoriasis, Raynaud's disease, ring worm, rosacea, scabies, scalp dandruff, scleroderma, sideroderma, sebaceous cyst, seborrheic keratosis, seborrheic dermatitis, shingles, skin cancer, skin tags, skin wrinkles, spider veins, squamous cell carcinoma, stasis dermatitis, sunburn, tick bites, *Tinea barbae, Tinea capitis, Tinea corporis, Tinea cruris, Tinea pedis, Tinea unguium, Tinea versicolor, Tinea*, tungiasis, UV skin damage, vitiligo, warts and a combination thereof.

13. The method of claim 12, wherein:
(a) the ozonated coconut oil releases or causes the generation of a reactive oxygen species upon application to the skin surface or the mucosal surface; or
(b) the ozonated coconut oil traps free radicals or suppresses their generation in vivo; or
(c) the ozonated coconut oil comprises an ozonated compound capable of passage through the skin surface or the mucosal surface to an intercellular space to come into contact with a red blood cell or an immunocompetent cell upon application to the skin surface or the mucosal surface; or
(d) any combination of (a) to (c).

14. The composition of claim 1, wherein the THC is present in an amount from about 50 mg/mL to about 300 mg/mL.

15. The formulation of claim 10, further comprising cannabidiol (CBD).

16. The formulation of claim 10, further comprising:
(a) a cannabinoid acid selected from the group consisting of cannabigerolic acid (CBDA), Δ9-tetrahydrocannabinolic acid (THCA), cannabidiolic acid (CBDA), cannabigervarinic acid (CBGVA), cannabichromenenic acid (CBCA), tetrahydrocanabivarinic acid (THCVA), cannabidivarinic acid (CBDVA), cannabichromevanrinic acid (CBCUA), and a combination thereof, wherein the cannabinoid acid is present in an amount of from about 0.01 mg/mL to about 10 mg/mL; or
(b) an additional cannabinoid selected from the group consisting of cannabigerol (CBG), cannabigervarin (CBGV), cannabichromene (CBC), tetrahydrocannabivarin (THCV), cannabidivarin (CBDV), cannabichromevanrin (CBCV), and a combination thereof, wherein the additional cannabinoid is present in an amount from about 0.01 mg/mL to about 25 mg/mL; or
(c) both (a) and (b).

17. The formulation of claim 10, further comprising an additional ingredient selected from among a fragrance, an essential oil, an antimicrobial agent, an antifungal agent, an analgesic, an amphoteric surfactant, an anionic surfactant, a cationic surfactant, a non-ionic surfactant, a zwitterionic surfactant, an excipient, a skin conditioning agent, a hair conditioning agent, a vitamin, a mineral, a plant extract, an anti-inflammatory agent, a UVA/UVB sunscreen, an emollient, a humectants, a moisturizer, a skin protectant, a silicone, a skin soothing ingredient, a solubilizer, an anesthetic, a colorant, a preservative, an anti-oxidant, a pH adjuster, a skin penetration enhancing agent, a skin cleanser, collagen, an oil, a saccharide, a rheology modifier, aloe vera, arrowroot powder, activated charcoal powder, coenzyme Q10, daisy extract, alpha lipoic acid, choline, hyaluronic acid, folic acid, zinc, copper, selenium, magnesium, calcium, potassium, silica, Dead Sea salt, dimethylaminoethanol, L-ascorbic acid, retinol, kojic acid, salicylic acid, alpha hydroxy acid, hydroquinone, and combinations thereof, wherein the additional ingredient is present in an amount from about 0.01 wt % to about 10 wt % based on the total weight of the composition.

18. The formulation of claim 10, further comprising:
(a) one or more than one terpene selected from among a-bisabolol, borneol, camphene, camphor, 3-carene, caryophyllene oxide, β-caryophyllene, a-cedrene, citronellol, p-cymene, eucalyptol, fenchol, geraniol, geranyl acetate, guaiol, a-humulene, isoborneol, (−)-isopulegol, limonene, linalool, menthol, myrcene, nerolidol, ocimene, phellandrene, phytol, α-pinene, β-pinene, R-(+)-pulegone, sabinene, α-terpinene, terpinen-4-ol, α-terpineol, 4-terlineol, terpinolene, valencene, and combinations thereof, or (b) one or more than one flavonoid selected from among apigenin, cannflavin A, cannflavin B, isovitexin, kaempferol, luteolin, orientin, quercetin, β-sitosterol, vitexin, and combinations thereof; or (c) both (a) and (b).

19. The formulation of claim 10, wherein the ozonated coconut oil comprises:

(a) an ozonide, an ozonate, a lipoperoxide, an aldehyde, a dicarboxylic acid, an oxocarboxylic acid peroxide, a diperoxide, a lipid hydroperoxide, or a combination thereof; or (b) an unsaturated fatty acid; or (c) an entrapped ozone, wherein the ozone is in an unreacted form, or in a sequestered form, or as a clathrate, or any combination of these forms, and the amount of ozone entrapped in the oil is from at or about 5 μg/ml to at or about 100 um/ml or (d) an ozonated compound capable of passage through a dermis or a mucosal surface; or (e) any combination of (a) to d).

20. The composition of claim 1, further comprising:

a vitamin in an amount from about 0.01 wt % to about 20 wt % based on the total weight of the composition;

an excipient selected from among a fatty alcohol, an ethoxylated fatty alcohol, an oil, a phospholipid, a ceramide, a hyaluronic acid, a fatty ester emollient, a humectant, a surface active agent, a mineral oil, a petrolatum, a wax, a silicone fluid, a quaternary nitrogen compound, and an amine functionalized silicone, wherein the excipient is present in an amount from about 0.01 wt % to about 20 wt % based on the total weight of the composition;

an essential oil in an amount from about 0.01 wt % to about 25 wt % based on the total weight of the composition.

* * * * *